US011628572B2

(12) United States Patent
Russell

(10) Patent No.: US 11,628,572 B2
(45) Date of Patent: Apr. 18, 2023

(54) ROBOTIC PACK STATION

(71) Applicant: MSC Services Corp., Melville, NY (US)

(72) Inventor: Darin Lee Russell, Harrisburg, PA (US)

(73) Assignee: MSC Services Corp., Melville, NY (US)

(\*) Notice: Subject to any disclaimer, the term of this patent is extended or adjusted under 35 U.S.C. 154(b) by 408 days.

(21) Appl. No.: 16/884,987

(22) Filed: May 27, 2020

(65) Prior Publication Data

US 2020/0376668 A1   Dec. 3, 2020

Related U.S. Application Data

(60) Provisional application No. 62/853,683, filed on May 28, 2019.

(51) Int. Cl.
| G06F 7/00 | (2006.01) |
| B25J 9/16 | (2006.01) |
| B25J 9/00 | (2006.01) |
| B25J 21/00 | (2006.01) |
| B31B 50/00 | (2017.01) |
| B25J 15/06 | (2006.01) |
| B65B 35/18 | (2006.01) |
| B65B 65/00 | (2006.01) |

(52) U.S. Cl.
CPC .......... *B25J 9/1679* (2013.01); *B25J 9/0093* (2013.01); *B25J 9/1697* (2013.01); *B25J 15/0616* (2013.01); *B25J 21/00* (2013.01); *B31B 50/006* (2017.08); *B65B 35/18* (2013.01); *B65B 65/003* (2013.01)

(58) Field of Classification Search
CPC ...... B25J 9/1679; B25J 9/0093; B25J 9/1697; B25J 15/0616; B25J 21/00; B25J 11/00; B31B 50/006; B65B 35/18; B65B 65/003; B65B 43/46; B65B 5/12; B65B 5/105; B65B 5/04; G05B 2219/45048
USPC ................................ 700/213, 228, 245, 253
See application file for complete search history.

(56) References Cited

U.S. PATENT DOCUMENTS

| 9,008,841 | B2 | 4/2015 | Fuhlbrigge et al. |
| 9,259,844 | B2 | 2/2016 | Xu et al. |
| 9,452,894 | B2 | 9/2016 | Puchwein et al. |
| 9,519,882 | B2 | 12/2016 | Galluzzo et al. |
| 9,550,624 | B2 | 1/2017 | Khodl et al. |
| 9,751,693 | B1 | 9/2017 | Battles et al. |
| 9,785,911 | B2 | 10/2017 | Galluzzo et al. |
| 9,919,872 | B2 | 3/2018 | Khodl et al. |
| 9,950,863 | B2 | 4/2018 | O'Brien et al. |
| 9,962,989 | B2 | 5/2018 | Jones et al. |

(Continued)

*Primary Examiner* — Yolanda R Cumbess
(74) *Attorney, Agent, or Firm* — Patent Technologies, LLC; Robert D. Gunderman, Jr.

(57) ABSTRACT

A robotic pack station is disclosed. The robotic pack station automates the transfer of items from a tote or bin to a shipping container such as a box in a warehouse, storage or sales facility. The robotic pack station includes system and method components, and includes a work cell with a robotic arm, machine vision or sensing system, a conveyor and pack platform. Imaging of the contents of the tote with a scan tunnel and connectivity with a sorter device allows for the operation of multiple robotic pack stations, each with a specialized function such as a small box line, a medium box line, and the like.

20 Claims, 22 Drawing Sheets

(56) References Cited

U.S. PATENT DOCUMENTS

| | | |
|---|---|---|
| 10,007,827 B2 | 6/2018 | Wagner et al. |
| 2017/0136632 A1 | 5/2017 | Wagner et al. |
| 2017/0225330 A1 | 8/2017 | Wagner et al. |
| 2018/0127219 A1 | 5/2018 | Wagner et al. |
| 2018/0268184 A1 | 9/2018 | Wagner et al. |
| 2020/0361083 A1* | 11/2020 | Mousavian ............ B25J 9/1697 |
| 2021/0158561 A1* | 5/2021 | Park ........................ G06T 15/20 |
| 2022/0067983 A1* | 3/2022 | Fidler .................... G06V 20/58 |

* cited by examiner

ROBOTIC PACK STATION

This application claims priority to U.S. patent application Ser. No. 62/853,683 filed May 28, 2019 entitled "Robotic Pack Station" by Darin Lee Russell, the entire disclosure of which is incorporated herein by reference.

BACKGROUND OF THE INVENTION

1. Field of the Invention

This disclosure relates generally to automated warehousing systems, and more particularly, to a robotic pack station.

2. Description of Related Art

Parts and supply distribution typically involves warehouses with racks, shelving and fixturing containing the various items that are sold. In businesses that involve warehousing, distribution and sales, an incoming order is received and then fulfilled. A key step in order fulfillment is locating each item on the order within a warehouse or distribution center and eventually packaging those items for shipment. Typically, order fulfillment involves locating each item and placing each item in a bin or tote for subsequent packaging and shipment. Once all of the various items contained on the order are located, removed from their rack, and placed in the bin or tote, the completed assemblage of items contained in the bin or tote is then taken to a packaging location where they are boxed with appropriate packing material, and shipped to a customer. Often this process is labor intensive. Items contained in the bin or tote must be removed and placed in a shipping container such as a box. Often, each item is removed from the bin or tote by hand, and placed in a box or shipping container individually, frequently with packing material and organization within the box to prevent damage during shipping.

What is needed is an automated and intelligent system for transferring ordered items from a bin or tote into a box or similar shipping container.

The present invention provides this automated and labor reducing functionality, as further described herein. Various embodiments of the present invention will further become evident to one skilled in the art after a review of this specification, claims and the attached drawings.

BRIEF SUMMARY OF THE INVENTION

In accordance with the present invention, there is provided a robotic pack station having a robotic arm, a specialized work cell, a specialized end effector, a machine vision system, machine learning software, a bar code scanner, and a conveyor system.

The specialized work cell is based on specific robot and lighting requirements, and is integrated with a novel scan tunnel, sorting, and conveyor system to accommodate multiple robotic pack stations each with a specific task or purpose. The robot will select a shipping container (such as a pre-formed shipping box) and place the shipping box in a specific location in the robotic work cell. The conveyor system is used to move a tote with selected items to a designated location in the robotic work cell when requested to do so by the system. The robotic arm and specialized end effector removes each item from the filled tote, and places each item in the shipping box. When the packing cycle is completed, the system scans the tote and carton bar code, the robot will push the resulting filled shipping box and the conveyor system will remove the empty tote out of the work cell.

The specialized end effector is attached to the robotic arm and is used to pick up each item in the tote and move it to the cardboard sheet or finished box. A machine vision system images each item to be picked up where the image (a digital representation of the image along with associated parameters) is then used by machine learning software to determine how to properly pick up and place that specific object. Through each pick and place operation, the robotic pack station, through machine learning software, will improve through the continual collection of data related to the image and associated end effector movements. A conveyor or conveyors are used to move the totes and resulting packages in and out of the robotic pack station. The packing device may include a box cutting and forming unit, a finished box or package unit, or the like.

The foregoing has outlined rather generally the features and technical advantages of one or more embodiments of this disclosure in order that the following detailed description may be better understood. Additional features and advantages of this disclosure may also be determined after reading this specification and claims with the accompanying drawings.

The foregoing paragraph has been provided by way of introduction, and is not intended to limit the scope of this invention as defined by this specification, claims and the attached drawings.

BRIEF DESCRIPTION OF THE DRAWINGS

The invention will be described by reference to the following drawings, in which like numerals refer to like elements, and in which.

Figure 1:
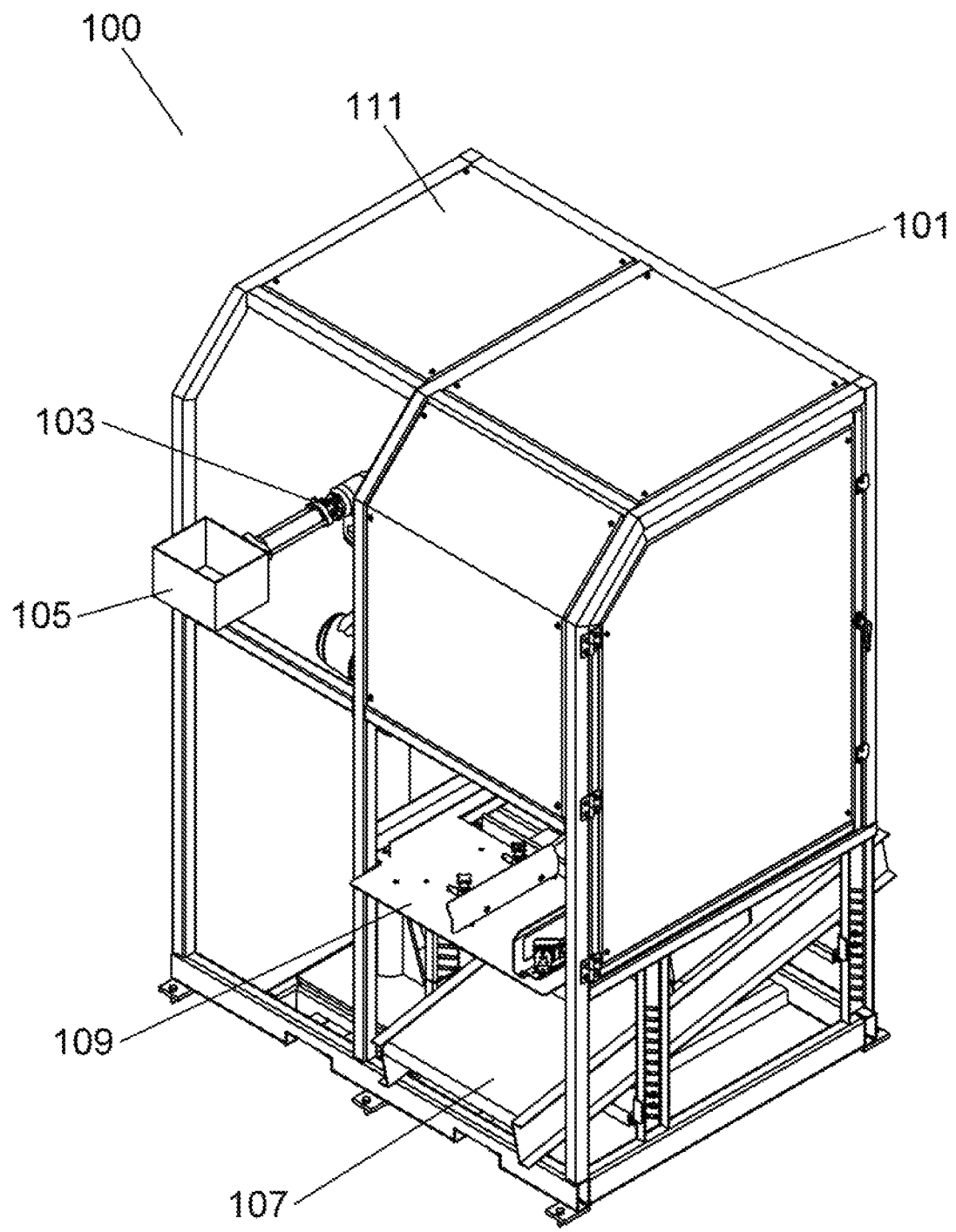
FIG. 1 is a perspective view of the robotic pack station.

The present invention will be described in connection with a preferred embodiment; however, it will be understood that there is no intent to limit the invention to the embodiment described. On the contrary, the intent is to cover all alternatives, modifications, and equivalents as may be included within the spirit and scope of the invention as defined by this specification, claims and the attached drawings.

DESCRIPTION OF THE PREFERRED EMBODIMENTS

For a general understanding of the present invention, reference is made to the drawings. In the drawings, like reference numerals have been used throughout to designate identical elements.

Disclosed is a robotic pack station that includes both system and method components, a detailed disclosure of each being provided herein. The system includes a work cell with a robotic arm, a machine vision system, a conveyor and a pack platform. The robotic arm has a novel end effector with control software that uses information from the machine vision system and associated machine learning software to move items from a temporary bin or tote to a shipping box or the like. A database that collects and stores raw and processed usage data is provided for machine learning and continuous operational improvement of the transfer and pack process. In some embodiments, a novel scan tunnel and sorter are used to facilitate operation of multiple robotic pack stations where each robotic pack station is configured for a specific purpose (such as packing small boxes, packing medium boxes, and the like).

Referring first to FIG. 1, the robotic pack station 100 can be seen. The system is contained or otherwise defined by a work cell 101. The work cell 101 is made of structural elements that comprise a frame or structural arrangement. While a specific structure is depicted in FIG. 1, it will be evident to those of skill in the art that variations of the geometry, style, shape, and other attributes is possible, and is within the scope of the present invention as defined herein. The work cell elements may be made from aluminum, steel, a plastic, carbon fiber, or the like. The elements may be extruded, formed or otherwise fabricated into structural elements. The work cell 101 may include guard panels 111 to both protect personnel from robot motion and also to provide shielding or control of lighting and other optical properties needed for proper performance of the machine vision system container therein. Attached to the work cell 101 or related structure is a control panel, panels, or housing(s) that contain such items as a computer, control boards, relay and contact boards or assemblages, and the like. The computer may be, for example, an industrial personal computer or the like. Conveyor controls and control logic may also be provided within or connected to the control panel. The work cell 101 may also contain lighting to accommodate proper machine vision sensing, detection and processing.

Contained within the work cell 101 is a robotic arm 103 that facilitates the retention and subsequent placement of ordered items from the bin or tote into or onto the shipping container. The robotic arm 103 may be obtained from any number of robotic arm manufacturers, such as Universal Robots of Odense, Denmark. While a variety of end effectors may be used with the robotic arm 103, a novel end effector 301 will be described by way of FIG. 3 and the subsequent disclosure provided herein. In FIG. 1, an ordered item 105 can be seen retained by the end effector 301 and robotic arm 103. It should be noted that the end effector 301 and robotic arm 103 are depicted in a position that is provided by way of example and clarity of illustration only. The ordered item 105 is shown protruding out from the work cell 101 in order to illustrate the way in which the end effector grasps and retains an object. In some embodiments of the present invention, the end effector may grasp and retain an object from the inside, the outside, or any other surface of the object or its related packaging. Further, the robotic arm 103 and retained object will in all likelihood be operating within the confines of the work cell 101. While the end effector 301 and associated robotic arm 103 are shown grasping an item such as a box, various items in the tote 401 (see FIG. 4) may be retained and subsequently moved to a shipping container on the pack platform 109. Further, in some embodiments of the present invention, an empty box or shipping container is retained from the inside.

Adjacent to the robotic arm 103 is a pack platform 109 with a packing tote conveyor system 107. The packing tote conveyor system 107 is connected to a further conveyor belt arrangement to bring a filled order into the robotic pack station by way of a bin or tote 401 (as seen in FIG. 4). The packing tote conveyor system 107 may have a box or bin guide on either side of the belt to ensure that the bin or tote enters the robotic pack station 100 correctly. The conveyor system 107 comprises a moving belt and drive motor or motors, and also has sensors and detectors to provide information to the robotic pack station control software regarding movement of a bin or tote 401 into the robotic pack station. The sensors and detectors may include, but are not limited to, photoelectric devices, ultrasonic devices, laser based devices, electromechanical actuators, switches, solenoids, and the like. In some embodiments of the present invention, the packing tote conveyor system 107 has a downward (or depending on the viewer's orientation, an upward) sloping section as it enters the work cell 101. This downwardly sloping section can be clearly seen in FIG. 1, and may, in some embodiments of the present invention, have a slope ranging from zero degrees to 60 degrees. The downwardly sloping conveyor section also is connected with a take-away conveyor system (not shown) that moves adjacent to the pack platform 109. Above the packing tote conveyor system 107 is a pack platform 109 that has fixturing to accommodate either flat cardboard that is in turn folded into boxes, or assembled boxes or shipping containers. In use, the robotic arm 103 and end effector 301 (see FIG. 3) grasp each item that comes into the robotic pack station on a bin or tote by way of the conveyor system 107, and moves each item into the pack platform area 109, either placing each item in a box or shipping container, or placing each item on a piece of packing material such as cardboard, where the packing material is then folded or otherwise formed around the placed items.

Figure 2:
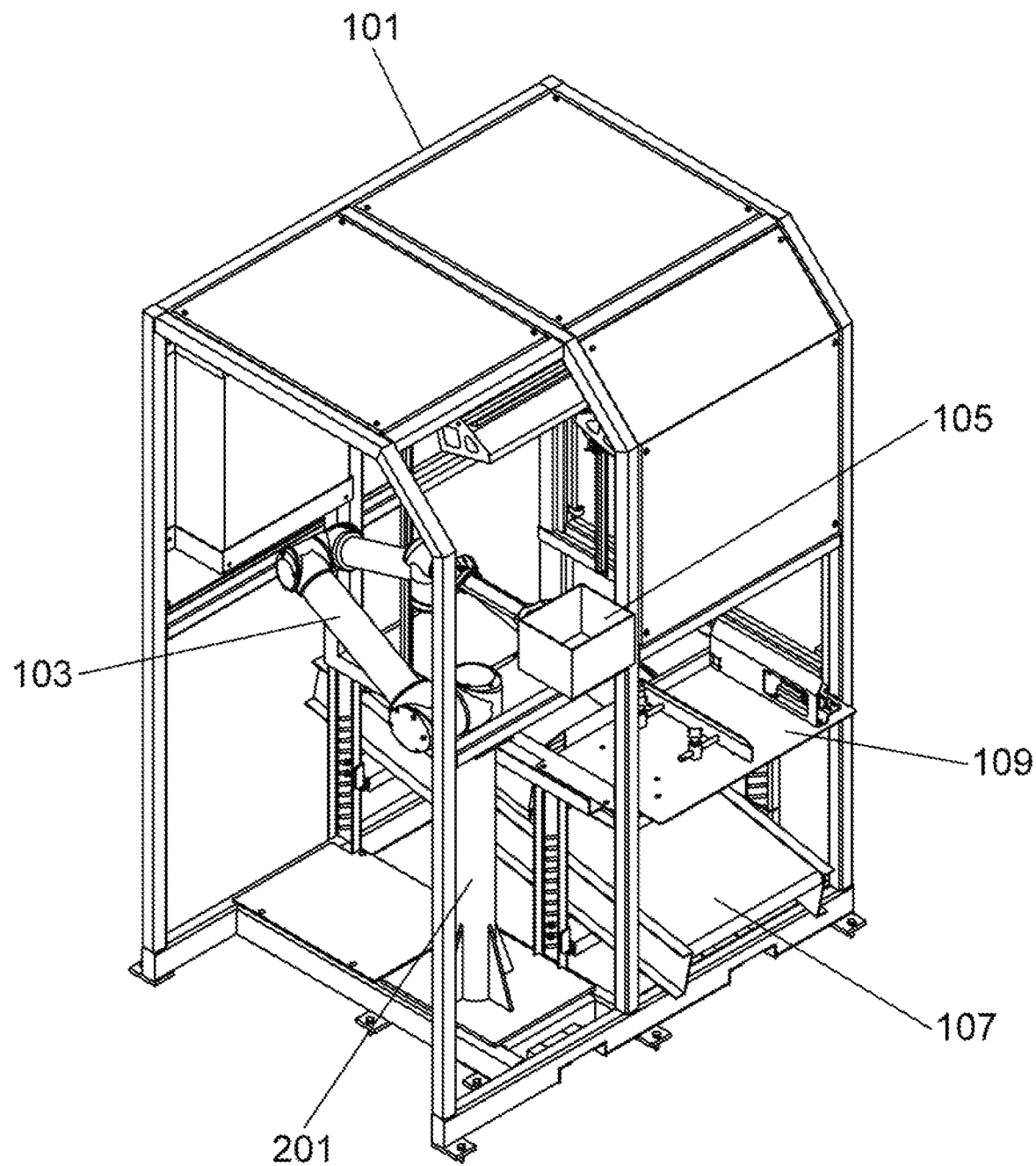
FIG. 2 is an alternate perspective view of the robotic pack station.

Referring now to FIG. 2, an alternate perspective view of the robotic pack station can be seen. The robotic arm 103 is connected with a base 201 that may in turn be connected or otherwise joined with a base of the work cell 101. Additional support such as angles, gussets, brackets, or the like may be employed to maintain the structural and operational integrity of the robotic arm 103. While FIG. 2 depicts some of the guard panels removed, in operation there may be additional, modified, or enhanced guard panels to not only maintain a safe working environment, but also to control lighting needed for the machine vision system, reduce noise, and the like.

Figure 3:
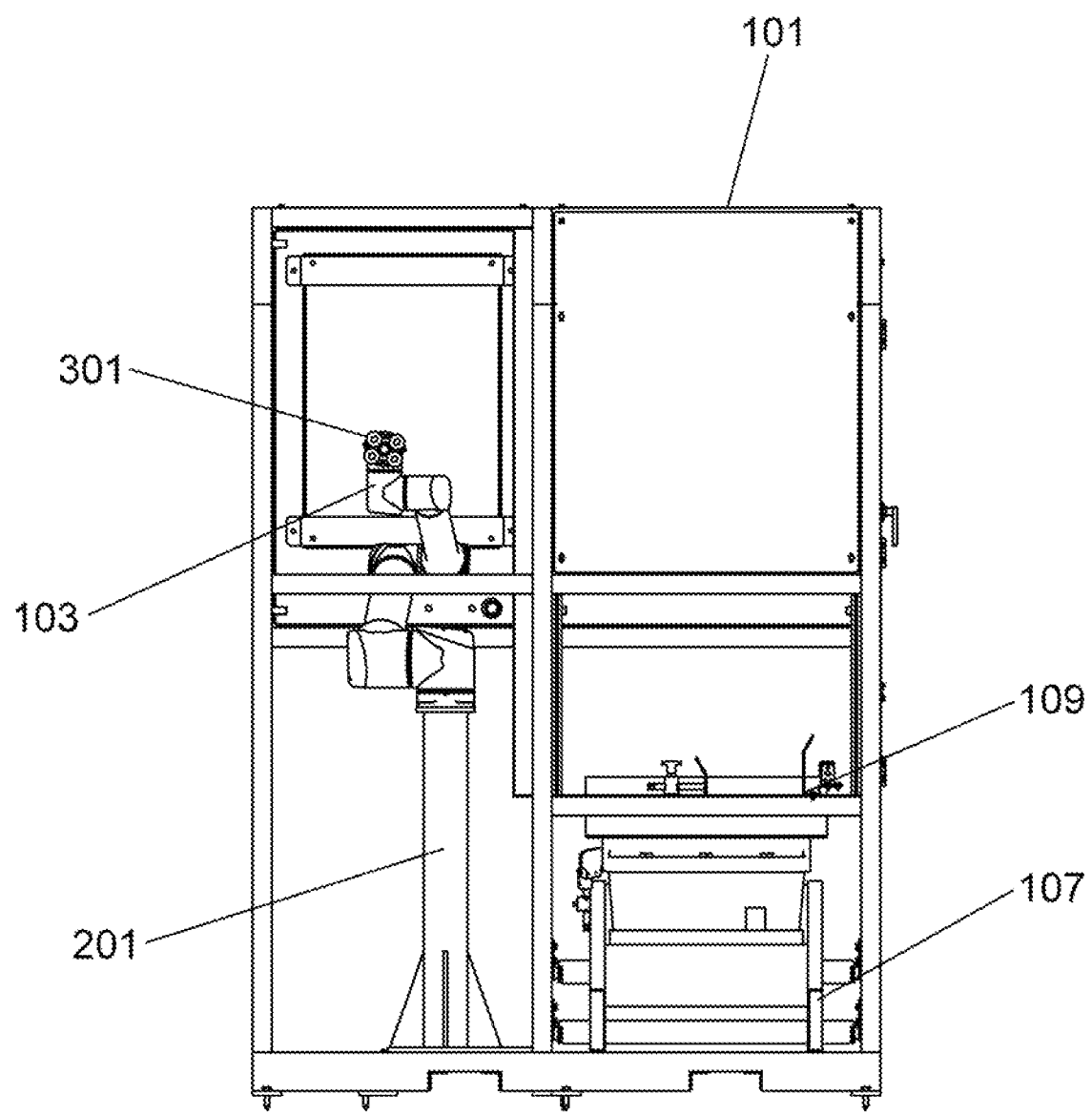
FIG. 3 is a front plan view of the robotic pack station.
Figure 4:
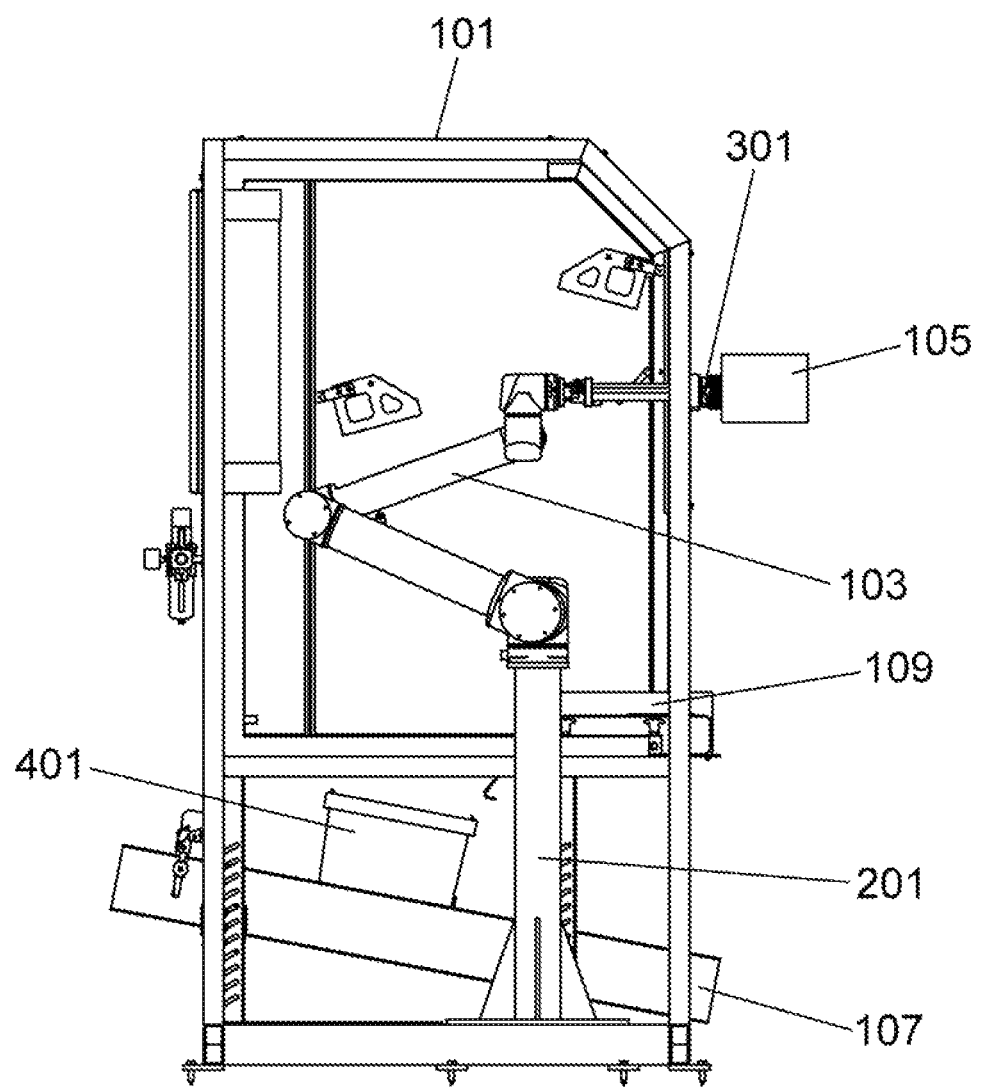
FIG. 4 is a side plan view of the robotic pack station.

FIG. 3 is a front plan view of the robotic pack station that shows the operational face of the end effector 301. The end effector 301 comprises retention appendages such as suction or vacuum assist points. In FIG. 3, these suction points are seen as an array of four with a center point or appendage. The four suction points that can be seen may, in some embodiments of the present invention, be arranged in a square or rectangular pattern. These suction or vacuum points are used to attach to or grasp ordered items and move the ordered items from the bin or tote to the shipping container. The suction or vacuum points comprise vacuum suction cups that are connected to a vacuum pump where the suction is controlled by software to grasp and release the ordered items. A center appendage or vacuum suction cup can also be seen. This center appendage is extendable, and may be used where the item does not lend itself to adequate retention by one or more of the four primary vacuum suction cups.

Turning now to FIG. 4, a side plan view of the robotic pack station is seen. The configuration of the conveyor system 107 and the angled position of the conveyor system 107 or the portion thereof that is contained within the work cell 101 can be seen along with a bin or tote 401. The pack platform 109 can be seen above the conveyor system 107. In FIG. 4, an item 105 can be seen retained by the end effector 301 and associated robotic arm 103.

Figure 5:
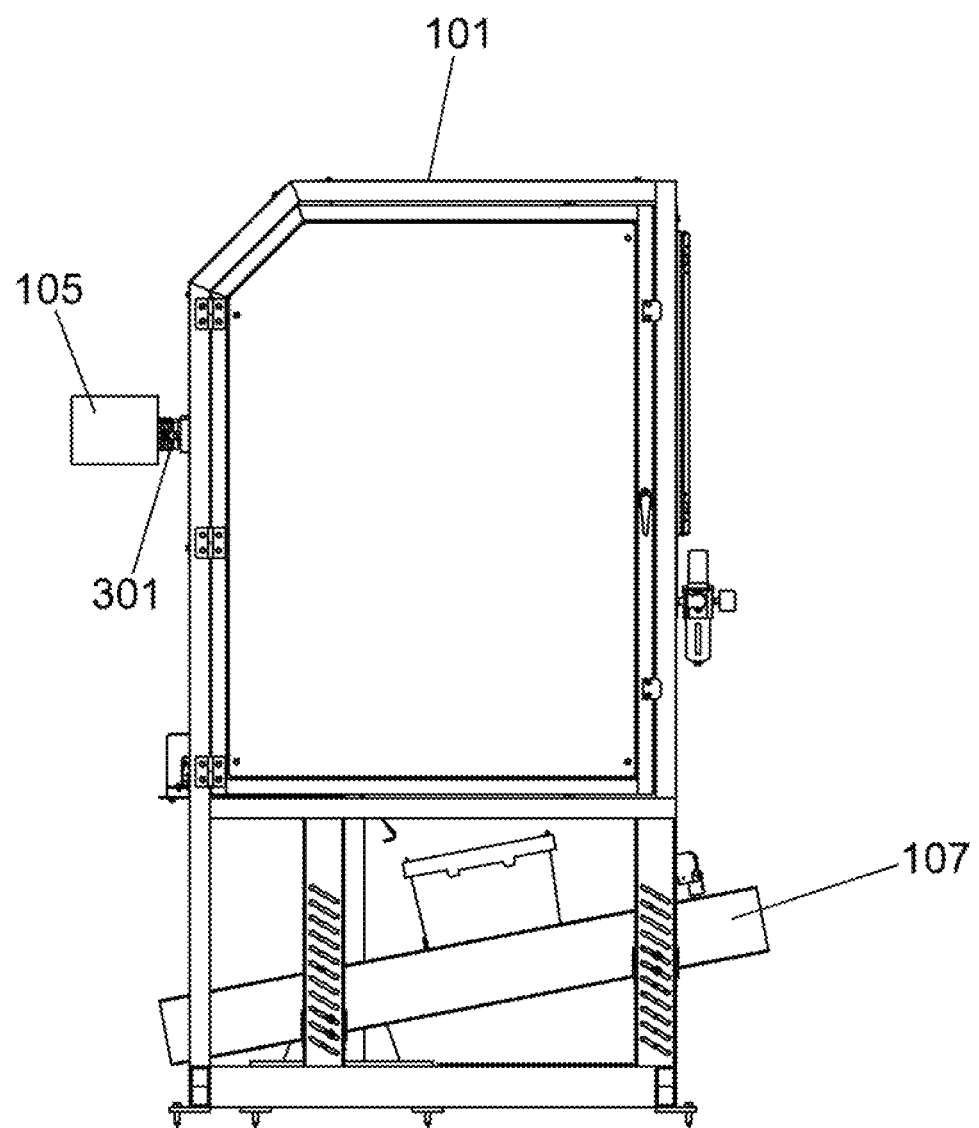
FIG. 5 is an alternate side plan view of the robotic pack station.

FIG. 5 is an alternate side plan view of the robotic pack station where the angled approach of the conveyor system 107 within the work cell 101 can be seen.

Figure 6:
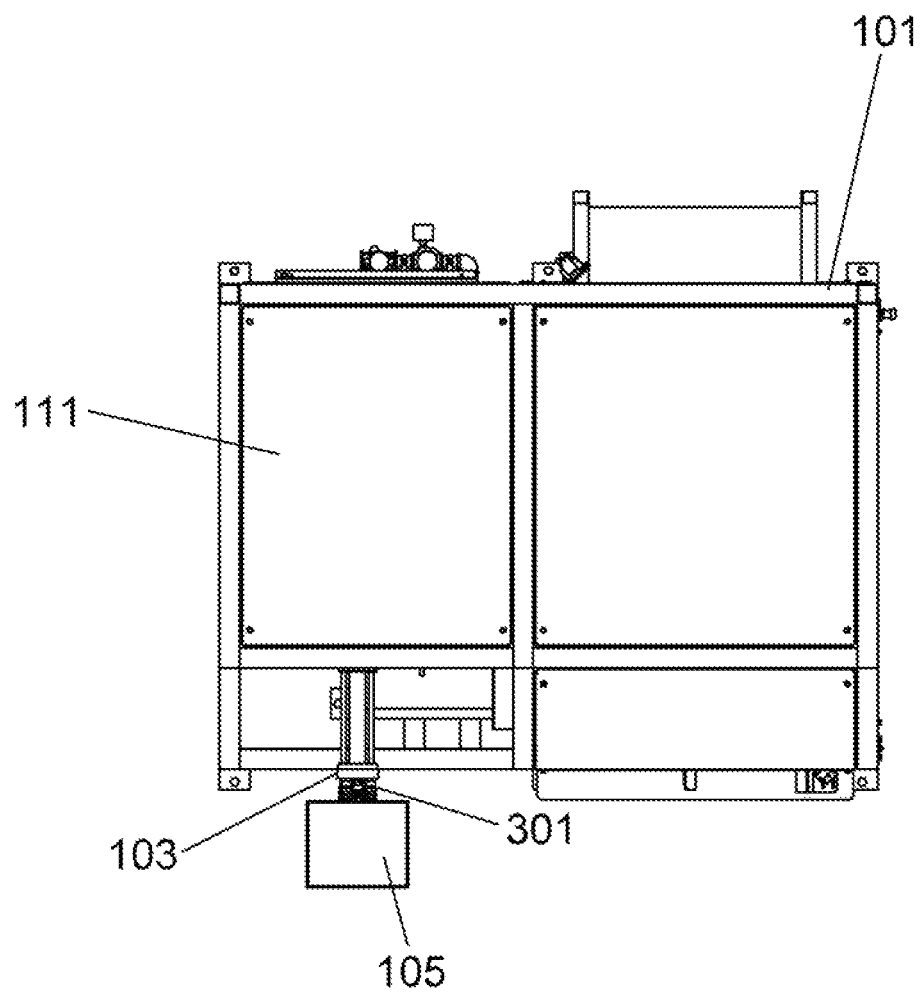
FIG. 6 is a top plan view of the robotic pack station.

FIG. 6 is a top plan view of the robotic pack station showing further guard panels 111 as well as the end effector 301 and associated robotic arm 103 protruding outward from the work cell 101.

Figure 7:
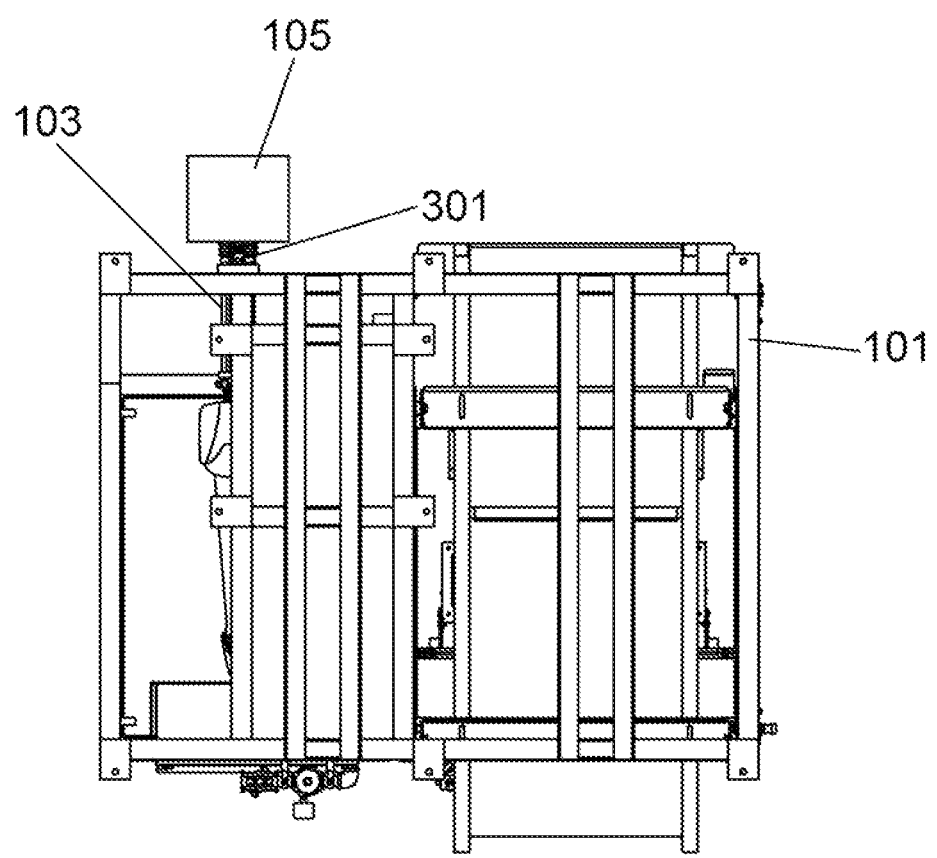
FIG. 7 is a bottom plan view of the robotic pack station.

FIG. 7 is a bottom plan view of the robotic pack station showing the frame and cross member arrangement of the work cell 101.

Figure 8:
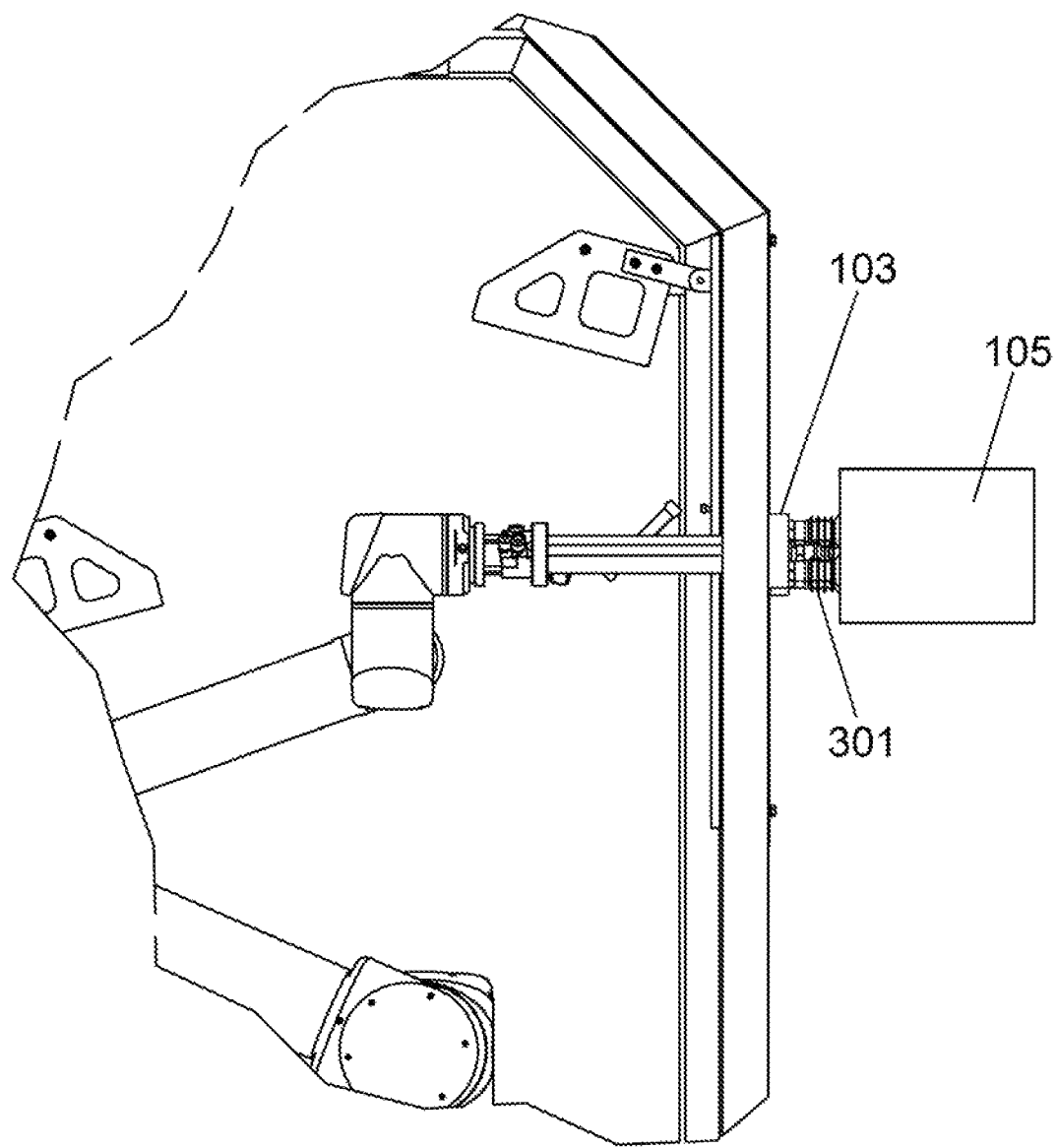
FIG. 8 is a cutaway side view of the robotic arm and end effector retaining an item.

FIG. 8 is a cutaway side view of the robotic arm 103 and end effector 301 retaining an item 105. In FIG. 8 the center appendage is in a retracted state and the peripheral vacuum suction cups or points are retaining an item 105.

Figure 9:
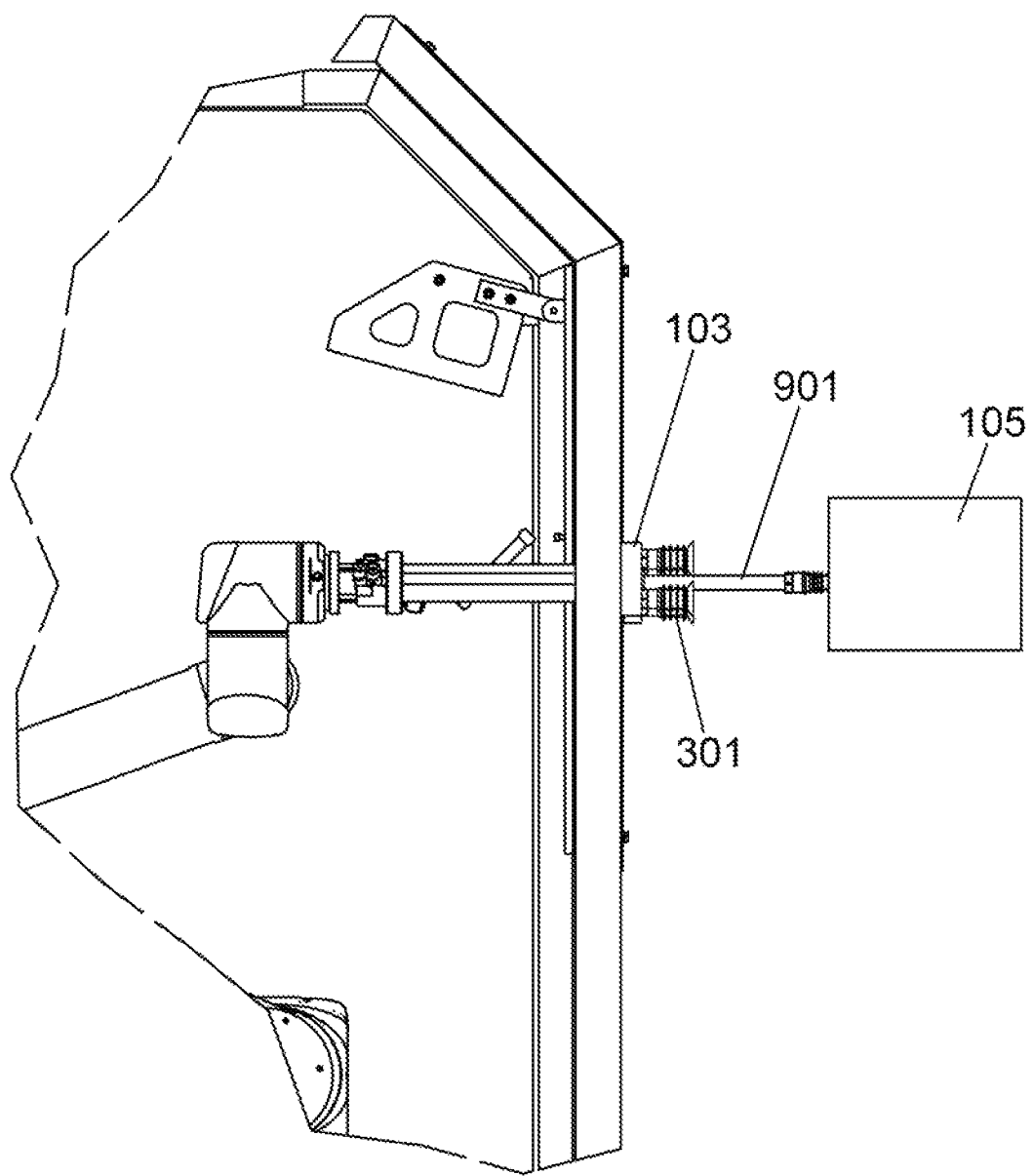
FIG. 9 is a cutaway side view of the robotic arm and end effector retaining a box with the extendable grip of the end effector.

FIG. 9 is a cutaway side view of the robotic arm and end effector retaining an item 105 with the extendable grip 901 of the end effector 301. In some embodiments of the present invention, the extendable grip 901 may vary in length. Further, FIG. 9 depicts the extendable grip retaining an item 105. The extendable grip 901 is often used to pick up items located in the tote 401 (see FIG. 4), and the item 105 depicted in FIG. 9 is merely provided by way of example, and not limitation. The extendable grip 901 is often used for items with geometries or surfaces that are difficult to retain, or where additional items are in the way of the item to be picked up.

Figure 10:
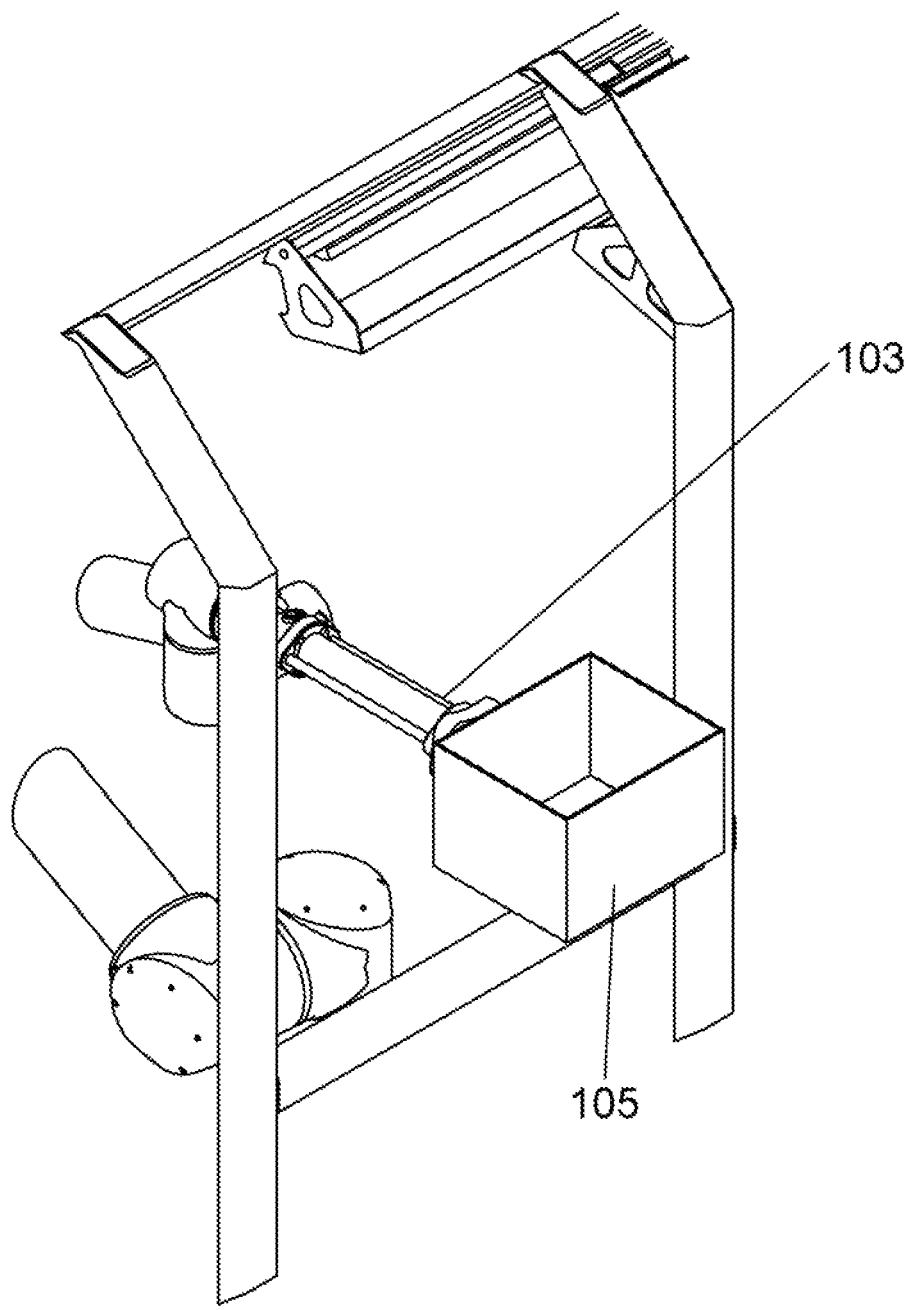
FIG. 10 is a cutaway perspective view of the robotic arm and end effector retaining an item.

FIG. 10 is a cutaway perspective view of the robotic arm 103 and end effector 301 retaining an item 105.

Figure 11:
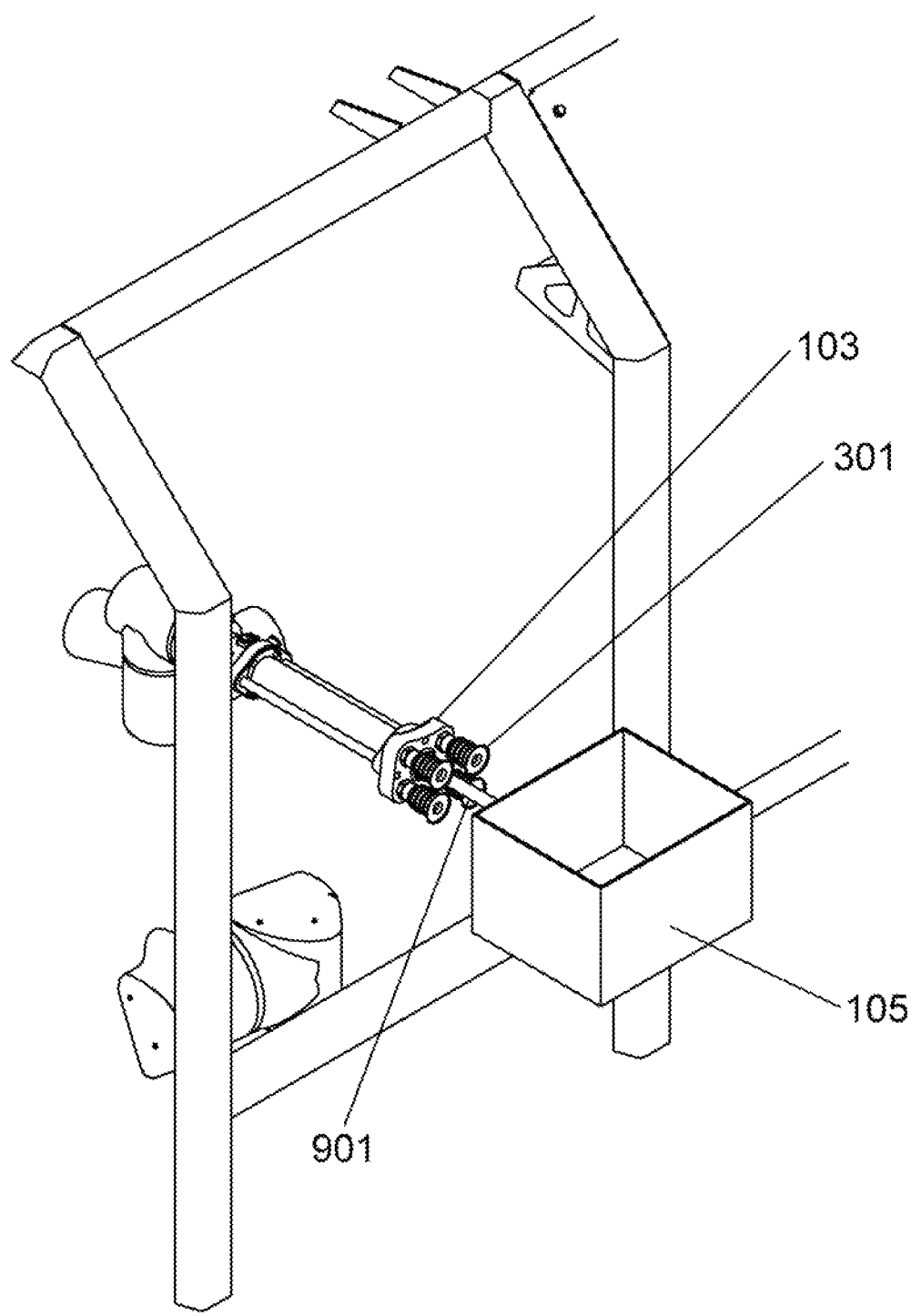
FIG. 11 is a cutaway perspective view of the robotic arm and end effector retaining an item with the extendable grip of the end effector.

FIG. 11 is a cutaway perspective view of the robotic arm 103 and end effector 301 retaining an item with the extendable grip 901 of the end effector 301. The extendable grip 901 may advance in an outward linear direction by way of air vacuum or pressure arrangements, or an electric motor and linear drive gear arrangement may be employed.

Figure 12:
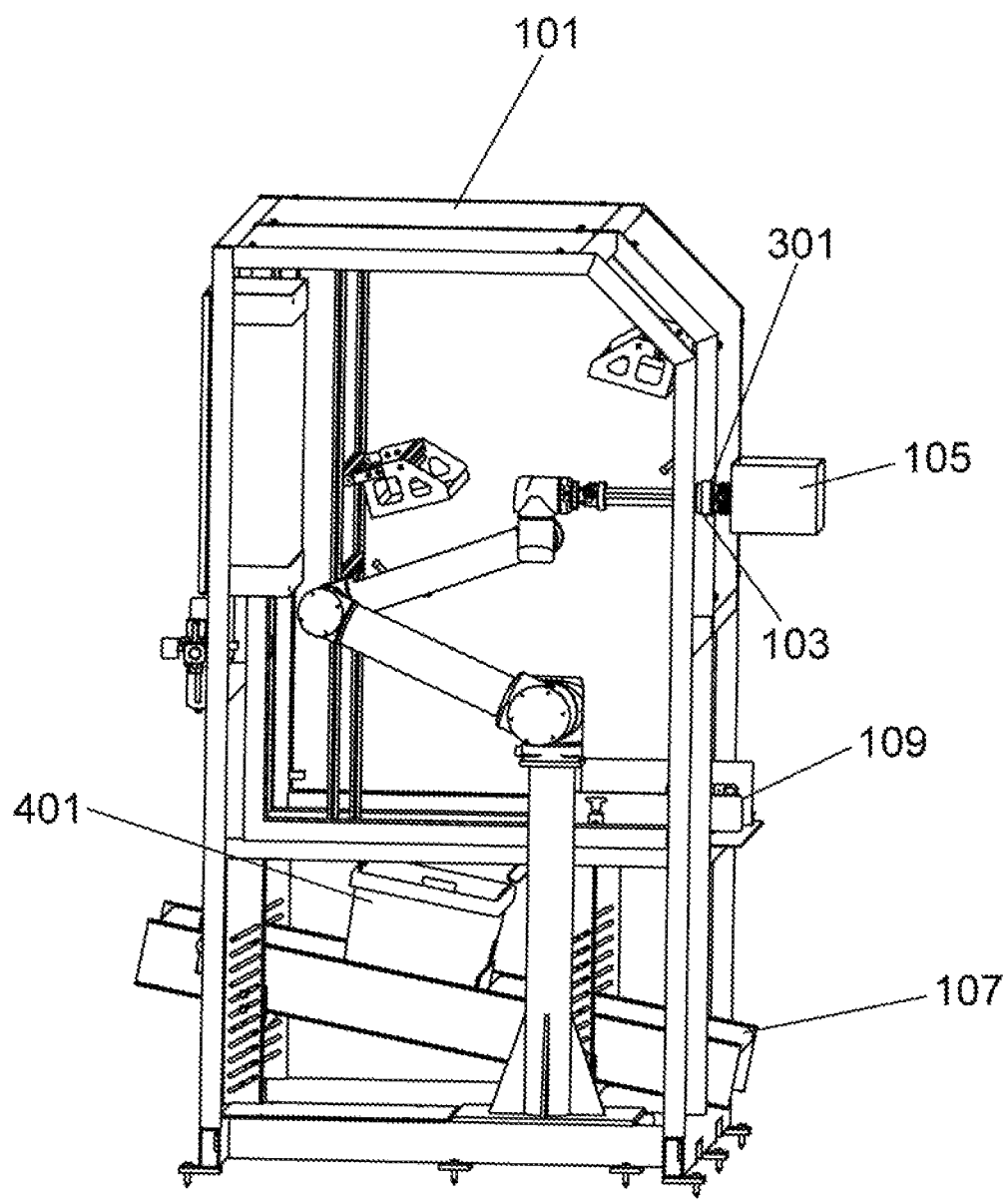
FIG. 12 is a slight perspective view of the robotic pack station.

FIG. 12 is a slight perspective view of the robotic pack station showing the relationship of the conveyor system 107, pack platform 109, and robotic arm 301.

Figure 13:
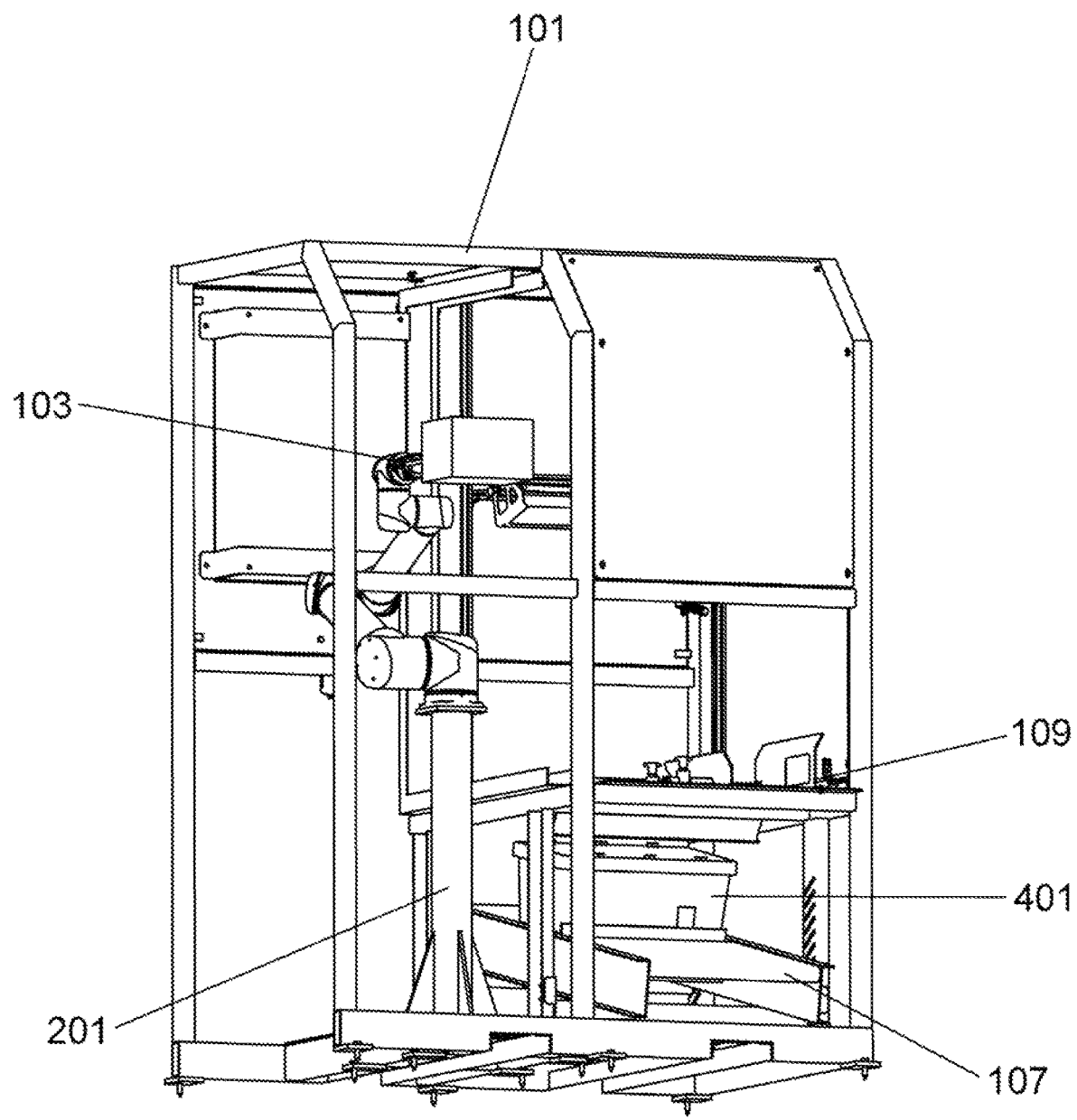
FIG. 13 is a lower perspective view of the robotic pack station.

FIG. 13 is a lower perspective view of the robotic pack station. Leveler legs or retention pads or pins may be employed to retain the robotic pack station on a floor or similar operating surface.

Figure 14:
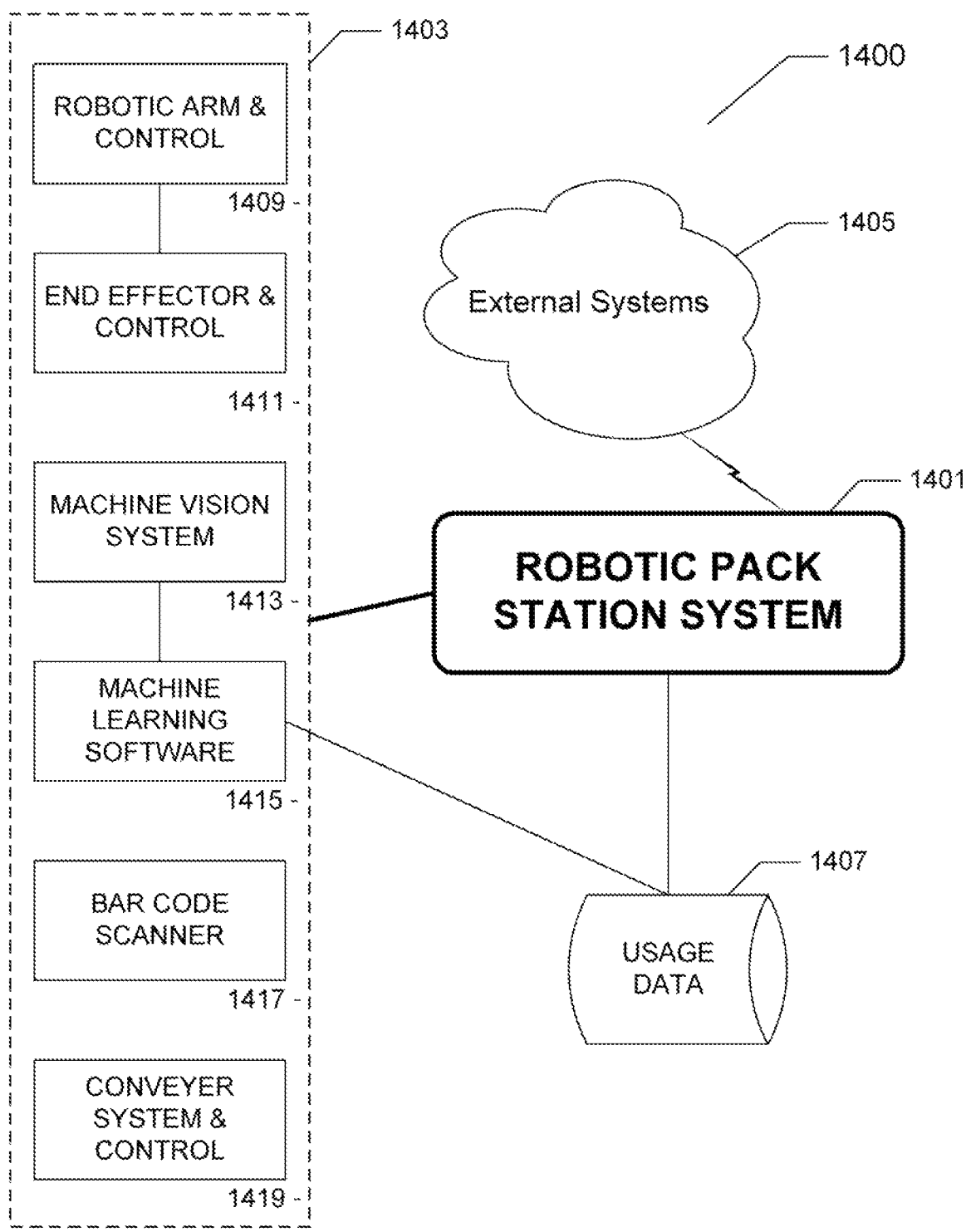
FIG. 14 is a system level diagram of the robotic pack station.

FIG. 14 is a system level diagram 1400 of the robotic pack station system 1401. Work cell elements 1403, as will be further explained herein, are operatively and functionally coupled to the robotic pack station system 1401. In some embodiments of the present invention, external systems 1405, such as inventory systems, order entry systems, performance metric systems, maintenance and diagnostic systems, and the like may be linked to the robotic pack station system 1401. To facilitate machine learning and operational improvements, usage data 1407 may be collected by the robotic pack station system 1401 and stored in a database or similar structure. Usage data includes information on the items that were detected, grasped and moved (packed), and the parameters by which that movement occurred (which vacuum suction ports were used, how much vacuum was applied, what the item was, how the item was packaged, if there were multiple pickup and move attempts, etc.). The usage data 1407 contains both item specific information as well as historical data on item detection, retention, and movement. Parameter changes used to improve item detection, retention and movement are also stored as usage data. Statistical techniques that involve usage data may also be employed to improve the performance of the robotic pack station. The work cell elements 1403 include both the robotic arm and robotic arm control 1409, which is in turn coupled with the end effector and end effector control 1411. Movement of the robotic arm and end effector are controlled by outputs from the machine vision system 1413 as well as trigger points such as conveyor movement, bin or tote arrival, shipping container status, and the like. The machine vision system 1413 images the items contained in the bin or tote and provides that information to machine learning software 1415. The machine learning software 1415 provides control to the robotic arm and end effector and is modified or otherwise improved upon with usage data 1407 that has been collected from the operation of the robotic pack station. A bar code scanner 1417 collects order information from bar codes that have been affixed to the bin or tote, or items contained in the order. The conveyor system has control software 1419 that is operationally coupled with the robotic pack station system 1401 to control functions such as conveyor start and stop, conveyor speed, conveyor load compensation, and the like.

Figure 15:
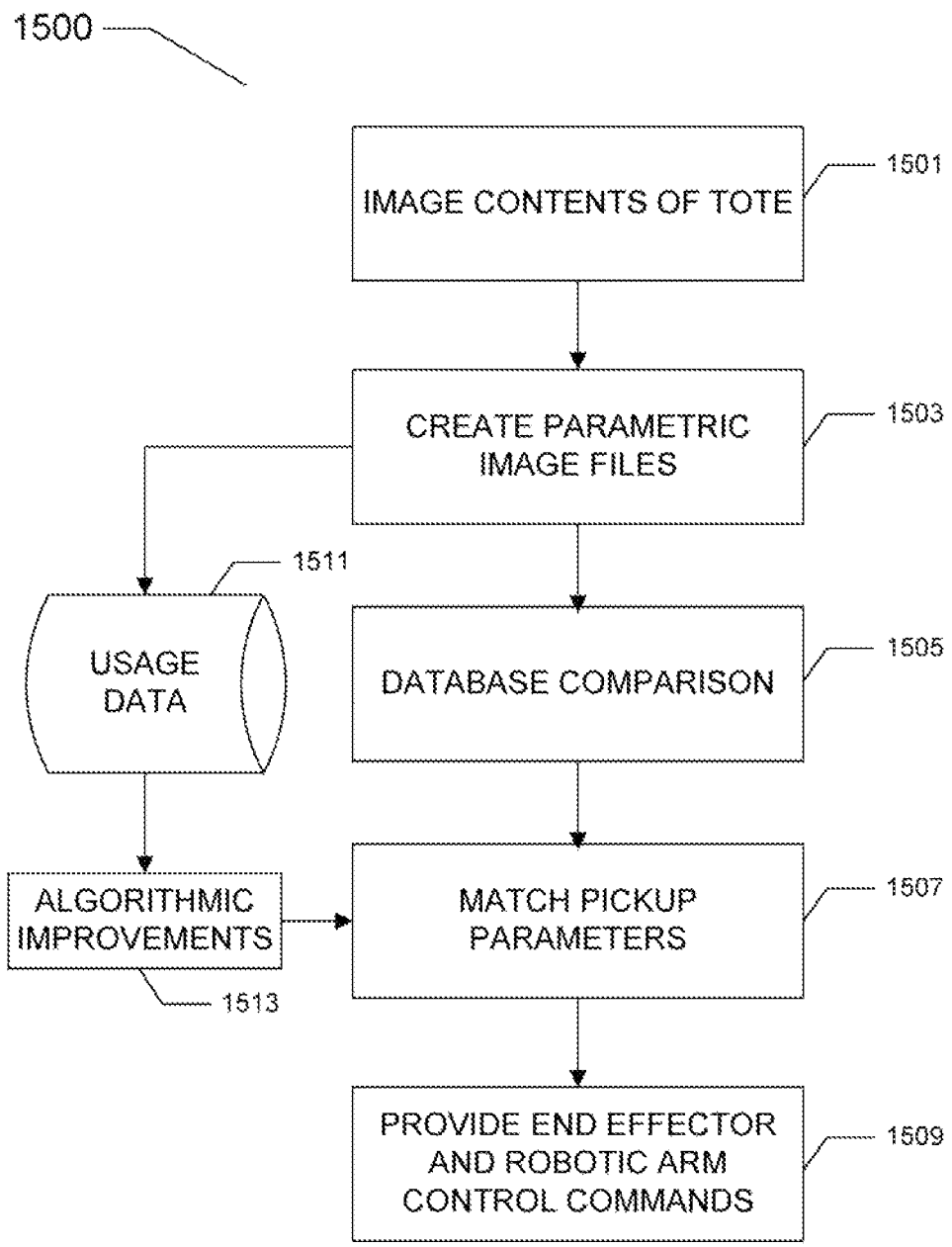
FIG. 15 is a flowchart depicting a method of the robotic pack station.

FIG. 15 is a flowchart depicting a method of the present invention that is used with the robotic pack station. As a bin or tote enters the robotic pack station by way of the conveyor, the contents of the tote (the order or parts thereof) are imaged by way of the machine vision system in step 1501. The image or images may include a digital representation of the contents of the tote, and these images are converted to parametric image files in step 1503. The parametric image files include attributes of the items in the tote, and are used in a database comparison step 1505 to determine the parameters to be used by the robotic arm and end effector to in turn pick up and move each item in the tote. Once the pickup parameters are matched with the specific item, the coordinates of the item and the associated pickup parameters are sent to the robotic arm and end effector in the form of control commands, and the item is moved from the tote to the shipping container or packaging on the pack platform. While the parametric image files are created and used to move each item, a copy of the parametric image files as well as processed data are sent to a database in the form of usage data 1511 where the usage data is in turn used to create algorithmic improvements 1513. This ongoing processing and refinement of software control logic by way of the collection and processing of ongoing usage data provides for a robotic pack station that adapts to the items that are repetitively packed by the system, or to new items that have similar attributes to those items that have been processed before. Once the database comparison 1505 is complete, pickup parameters are matched between the items to be retained and moved and similar items whose attributes are stored in a database. With a successful match of pickup parameters in step 1507, the end effector and robotic arm receive control commands in step 1509 to facilitate movement of the matched item from the bin or tote to the shipping container.

Figure 16:
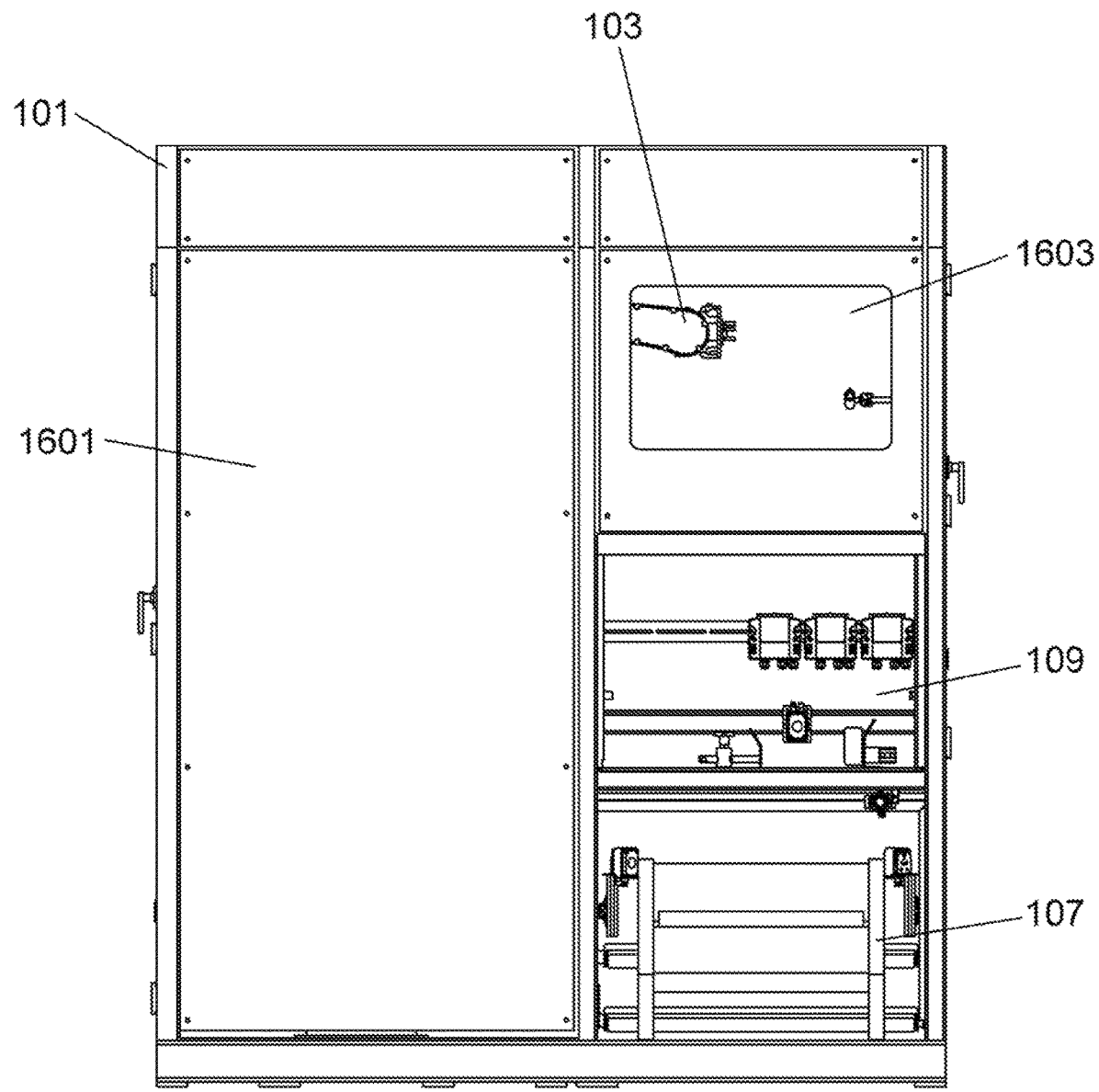
FIG. 16 is a font plan view of the robotic pack station with operating guards in place.

During operation, the robotic pack station may also include safety and operational items, such as guards, guards with viewing or operational openings, and the like. Guards may be made from a variety of materials, such as a metal or plastic sheet stock. The guards may be clear to allow a technician or worker to ensure proper functionality of the pack station, or may contain viewing openings or operational openings. For example. FIG. 16 is a front plan view of the robotic pack station with operating guards in place. A primary guard 1601 can be seen covering the main robotic arm components. An operating guard 1603 can also be seen having an access opening that allows the robotic arm to operate through the access opening but still allow a degree of protection.

Figure 17:
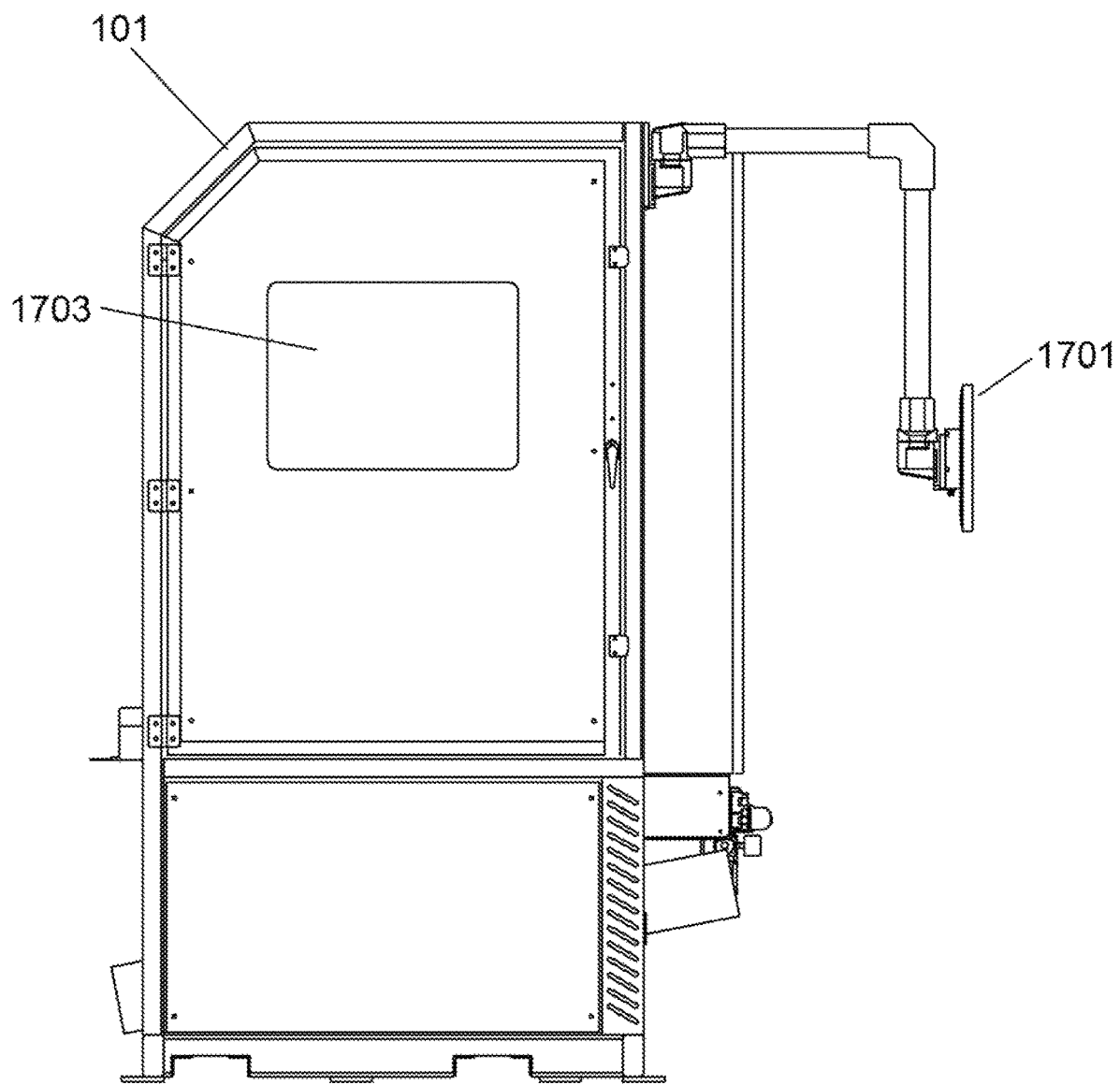
FIG. 17 is a front plan view of the robotic pack station with operating guards in place.

FIG. 17 is a front plan view of the robotic pack station with operating guards in place. A side guard 1703 having an optional viewing port can be seen. In some embodiments, this guard and others may be made from a clear material such as an acrylic sheet to obviate the need for a viewing port. In some embodiments the guards may be made from a solid material, for example a metal such as steel or aluminum, and contain a clear viewing port material such as a clear acrylic (poly methyl methacrylate) or the like.

It should be noted that the robotic pack station may also contain one or more control monitors 1701, as seen in FIG. 17. Such a control monitor may provide visual information to a user such as process status, number of jobs completed, maintenance issues, speed, and the like. Control monitors 1701 may also provide the opportunity for a user to control the functionality of the robotic pack station, change operational parameters, and the like.

Figure 18:
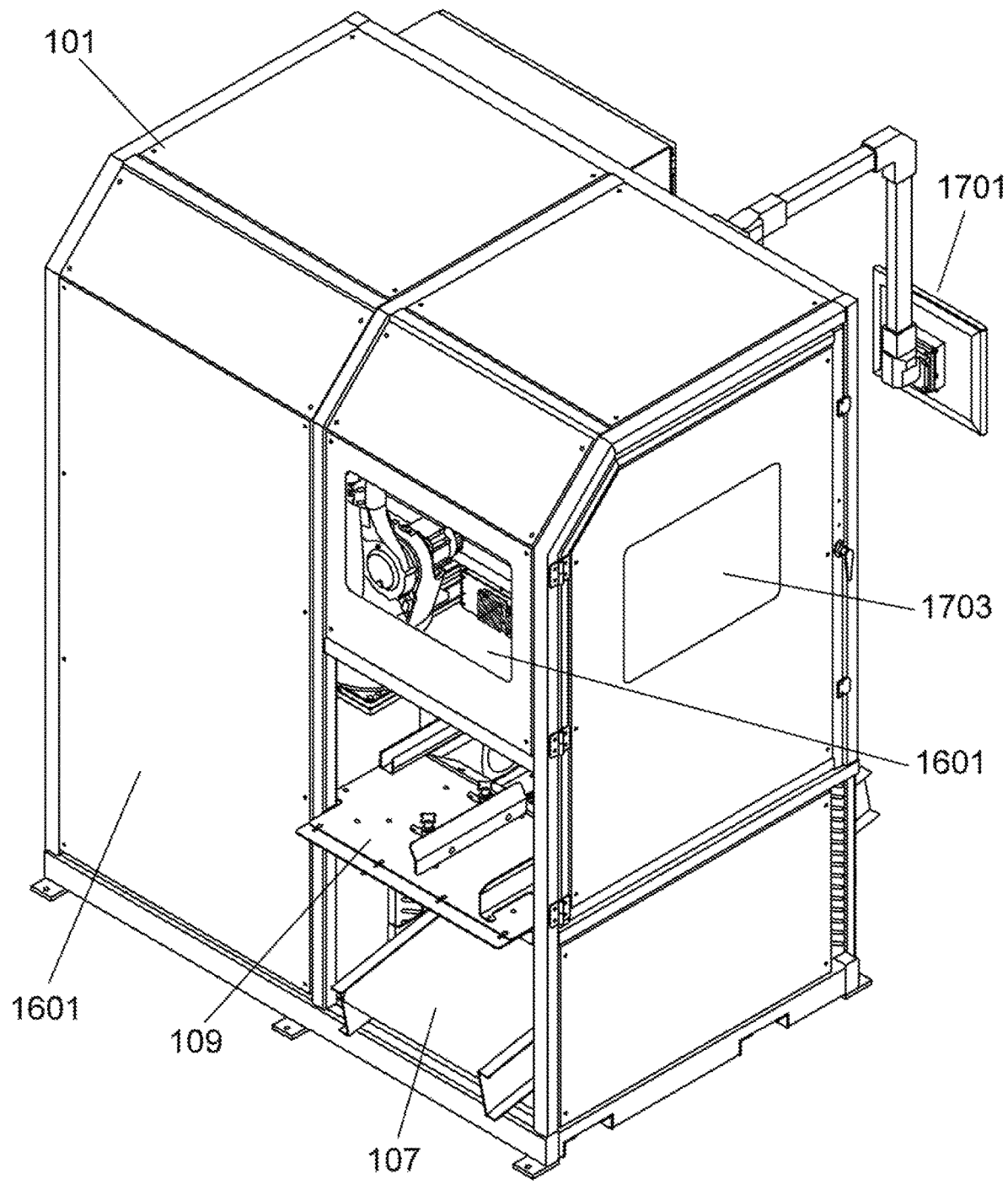
FIG. 18 is a perspective view of the robotic pack station with operating guards in place.

FIG. 18 is a perspective view of the robotic pack station with operating guards in place. The configuration and placement of operating guards may vary based on the specific application and operating environment.

To facilitate further and complete understanding of the present invention and the systems and methods described herein, these further series of figures and descriptions are provided.

Figure 19:
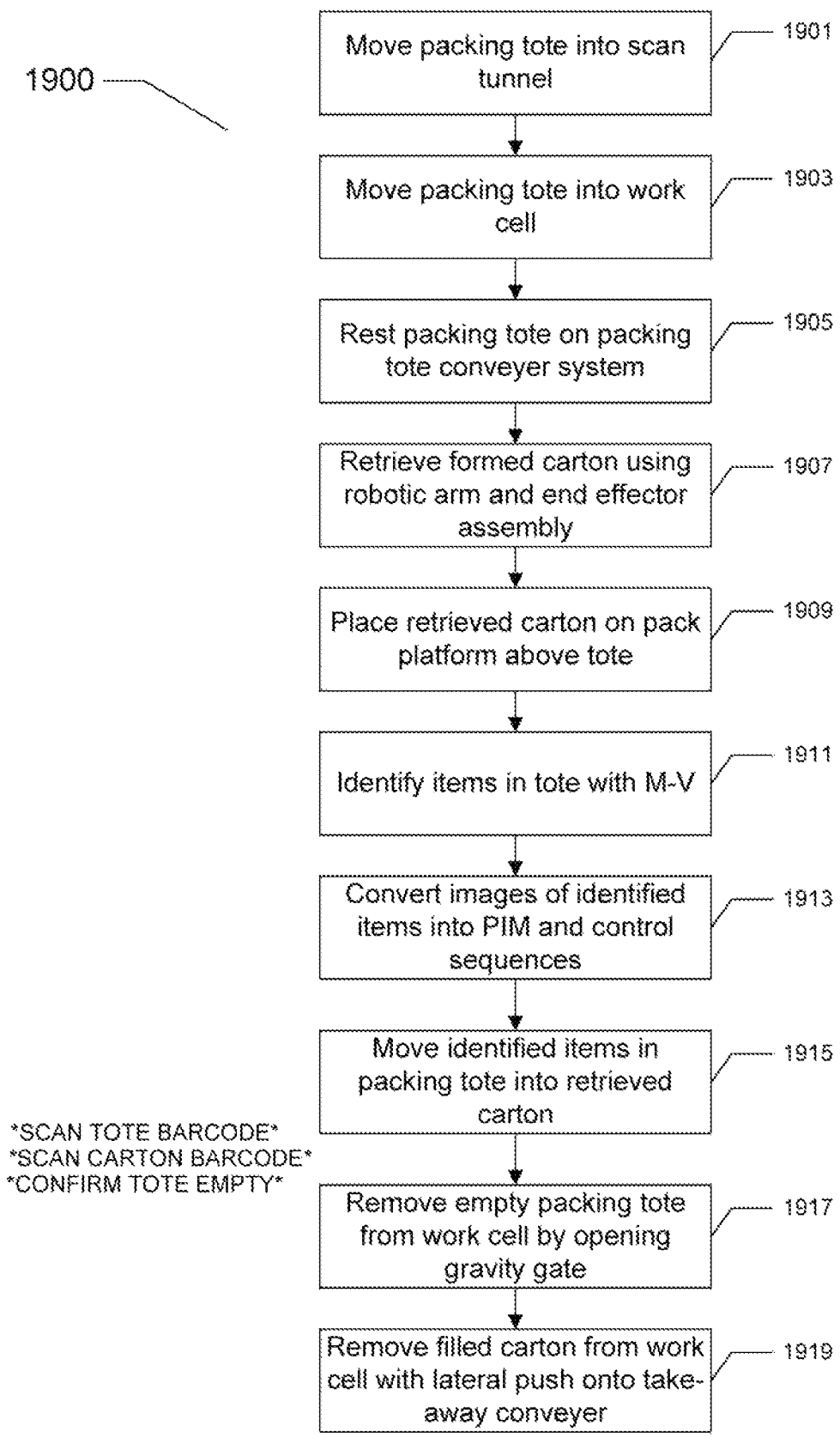
FIG. 19 is a flowchart depicting workflow in and out of the robotic pack station.

FIG. 19 is a flowchart depicting workflow 1900 in and out of the robotic pack station. It should be noted that these steps may be executed manually, semi-manually or in an automated or fully automated manner and by way of a computer, a computer network, a processor or processors. Thus, these steps may be embodied in a software program or programs resident on a computer, a computer network, processor or processors. In step 1901, a packing tote is moved by way of a conveyor or similar device into a scan tunnel. The scan tunnel contains a machine vision system that scans the items contained in the packing tote for an assessment of the size of each item contained in the packing tote. This scanning process flags the tote as one containing small, medium or large items, and routes the scanned tote to the appropriate robotic pack station. This is more fully described by way of FIG. 22 and the related description. In step 1903, the packing tote is moved into the selected work cell (the robotic pack station) by way of a packing tote conveyor system or the like. Once the packing tote is in the correct position within the work cell, it comes to rest in step 1905. In a related process, a carton is formed, typically from cardboard, that matches the size profile of the items that were scanned in the scan tunnel. It should be noted that the term carton may refer to a box such as a cardboard box, but also includes any container or packaging that serves to retain, cover, or protect the items contained there within. The formed carton is then retrieved in step 1907 using the robotic arm and end effector of the present invention. The retrieved carton is then placed on the pack platform (see 109 FIG. 1) above the rested tote in step 1909. In step 1911, the items contained in the tote are identified using a machine vision system. Images of the identified items are then converted into Parametric Image Files (PIM) or other similar files and control sequences that define the way in which the robotic arm will pick up each item are created in step 1913. Using these created control sequences, the identified items are then moved with the robotic arm and end effector from the packing tote into the retrieved carton in step 1915. Preferably at this point a barcode contained in the packing tote and a barcode contained on the carton are scanned using a barcode scanner, and the scanned barcode information from each are sent to the computer, processor or computer network for further processing. An imaging or sensing system such as a machine vision system will also confirm that the packing tote is empty prior to step 1917. Alternative technologies to machine vision, including, but not limited to, force or weight sensors, ultrasonic sensors, laser or optical scanning devices, and the like, may also be employed. In step 1917, the empty packing tote, which is resting on an inclined packing tote conveyor, is removed from the work cell by way of a gravity gate or the like. The gravity gate provides a physical barrier to the packing tote, maintaining a stationary position while the packing tote is being unloaded by the robotic arm and ancillary equipment. The gravity gate can be actuated such that it is no longer a barrier for the packing tote to move freely and downhill, and as such, provides a mechanism to remove the packing tote from the work cell once the contents are removed and packing into a carton. In step 1919, the filled carton is removed from the work cell. In one embodiment, the filled carton is removed from the work cell by way of a lateral push from the robotic arm and end effector assembly, causing the filled carton to slide or otherwise displace from the work cell pack platform or adjacent location and onto a take-away conveyor where the packed carton is taken for further processing and shipment.

Figure 20:
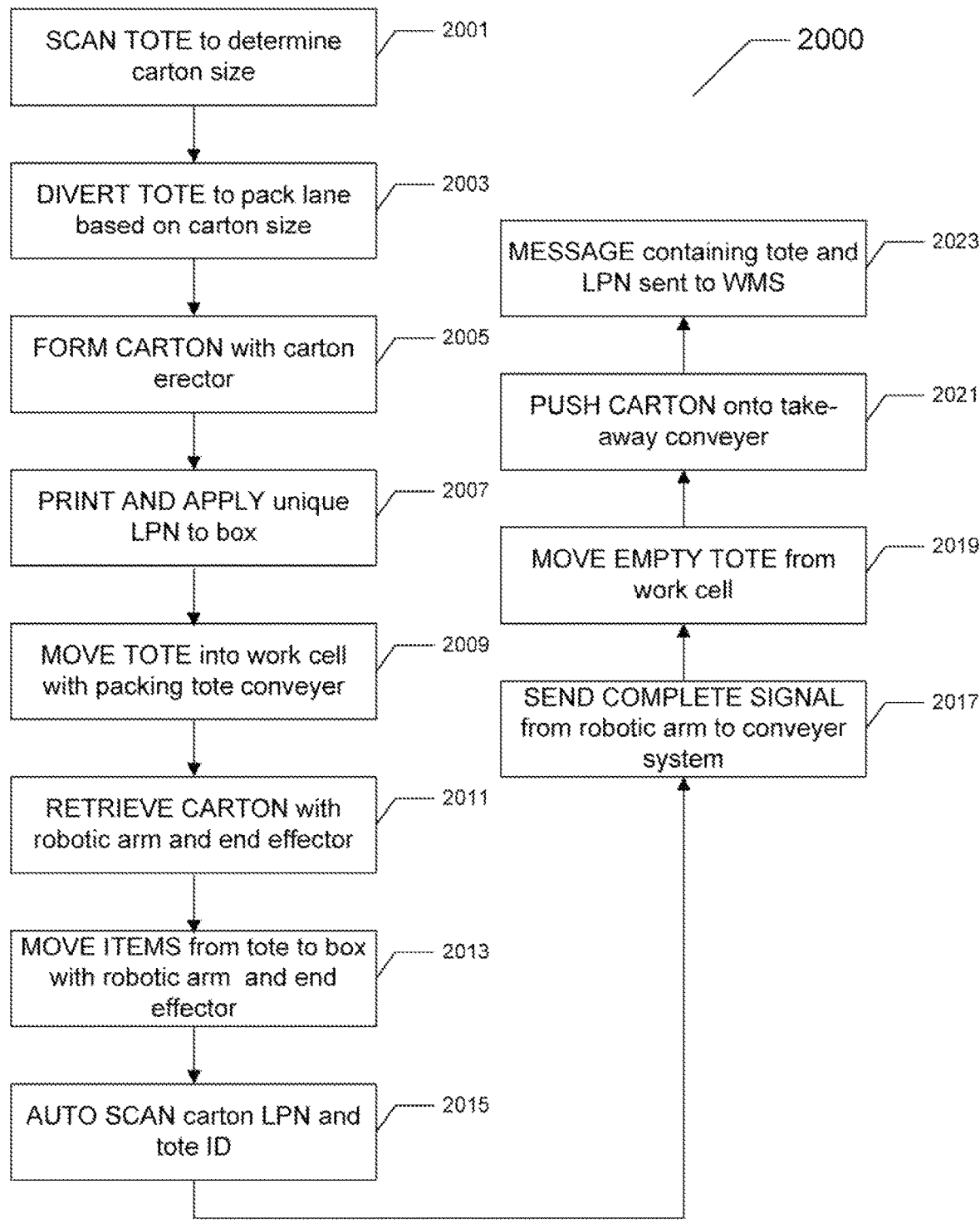
FIG. 20 is a flowchart depicting process steps of the packing operation.

Turning now to FIG. 20, a flowchart depicting process steps of the packing operation can be seen. As packed totes (the equivalent of orders) enter the system of the present invention, the packed totes are scanned in a scan tunnel arrangement (further described by way of FIG. 22) where the contents of each tote are determined, primarily to determine the size of each item and quantity, to allow the packing tote to be sent to the correct robotic pack station based on carton size or other parameters in step 2001, or in some embodiments, to send control commands to a robotic pack station to configure the correct size carton for packing. The scan tunnel comprises at least one sensor or sensing system, and is not necessarily physically closed (although with some technologies such as machine vision a partially closed arrangement improves image quality and characteristics needed for deterministic actions. Alternative technologies to machine vision, including, but not limited to, force or weight sensors, ultrasonic sensors, laser or optical scanning devices, and the like, may also be employed. In a configuration where multiple robotic pack stations are employed based on carton size or other pack characteristics (as further described by way of FIG. 22), the packing tote is diverted to the appropriate pack lane (and subsequent robotic pack station) based on the contents of the packing tote as scanned in step 2001. Diverting the packing tote to a select pack lane in step 2003 based on carton size is done by way of a conveyor system that is switched to allow selection of the appropriate conveyor lane based on the scan performed in step 2001. In step 2005, a carton is formed from sheet stock or other material by a carton erector. In step 2007, a unique LPN is printed and applied to the carton (the box). An LPN (License Plate Number) is a unique barcode label that is applied to the carton. In step 2009, the packing tote is moved into the work cell with the packing tote conveyor. It should be noted that in some embodiments the packing tote conveyor enters the work cell at a downwardly sloping angle, and below the pack platform. The work cell is defined to be that portion of the robotic pack station that is confined to a framed enclosure, such as depicted in FIG. 1 and related figures. Components outside of the work cell, such as the scan tunnel, conveyors, gates, carton delivery system (such as a carton erector), label applicators, and the like, are considered components of the robotic pack station, and may be used in whole or in part, or in conjunction with other components that facilitate the functionality of the robotic pack station as described and envisioned herein. In step 2011, a formed carton (such as a cardboard box) is retrieved with the robotic arm and end effector and placed on the pack platform 109 (see FIG. 1 and related figures). In step 2013 the items contained in the packing tote that is resting on the packing tote conveyor below the pack platform are moved by the robotic arm and end effector from the packing tote and into the formed carton above the packing tote (resting on the pack platform). In subsequent step 2015 the carton LPN and tote ID are scanned (AUTO SCAN) and the scanned information is sent to a downstream computer system for further processing and status update. Now that the carton has been packed (and an empty tote confirmed), a COMPLETE signal is sent through interaction between the robotic arm and the conveyor system in step 2017. In step 2019, the empty tote is moved from the work cell by way of the packing tote conveyor, and in some embodiments, by way of an inclined packing tote conveyor and gravity gate configured therein. In step 2021, the filled carton is pushed onto the take-away conveyor by way of a lateral push or similar movement or displacement of the robotic arm and end effector arrangement. In step 2023 a message is sent to the Warehouse Management System (WMS) containing the tote and LPN information.

Figure 21:
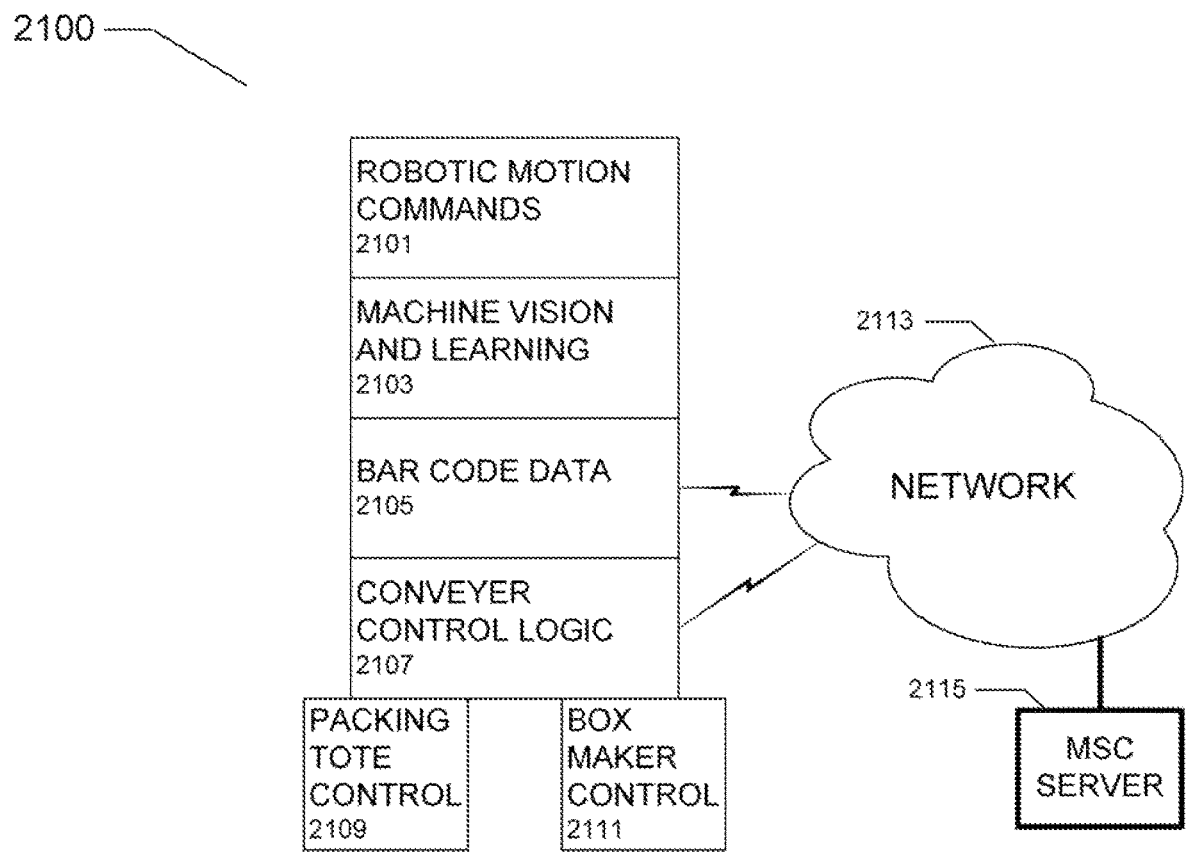
FIG. 21 is a system level diagram of the robotic pack station.

FIG. 21 is a system level diagram of the robotic pack station depicting the software and software control related aspects of the present invention. While not wishing to be bound to any particular technology, vendor, software programming environment, command lines in a software program or other such unnecessary constraints, the various software and software control elements of the present invention are depicted. Robotic motion commands 2101 include commands that are based on both user input as well as temporal and sensor based inputs, and control the motion and actions of the robotic arm and end effector arrangement as described herein. Machine vision and learning components 2103 include a machine vision system that images and senses the items in the packing tote for proper packing and handling by the robotic arm and end effector arrangement, as further described herein. Bar code data 2105, as also further described herein, includes bar codes and subsequent scanned data that are contained on the packing tote, the carton, items and the like. The flow of packing totes into and out of the system, as well as the flow of packed cartons out of the system is regulated by conveyor control logic 2107. Such conveyor systems and their functionality are described herein and further depicted by way of FIG. 22 and related figures. Packing tote control 2109 defines actions such as shipping information for the contents of the packing tote, contents and order number of the packing tote, selection of pack lane and related robotic pack station for the packing tote, and the like. Box maker control 2111 defines the size of the carton to be used (made), when the carton is to be readied for pack station operations, and the like. A network 2113 provides information from components of the robotic pack station (such as conveyor control logic, bar code data, and the like) to an MSC server 2115, computers or computer network. Information flow from the remaining control elements, although not depicted in FIG. 21, may also occur either directly or through other control elements.

Figure 22:
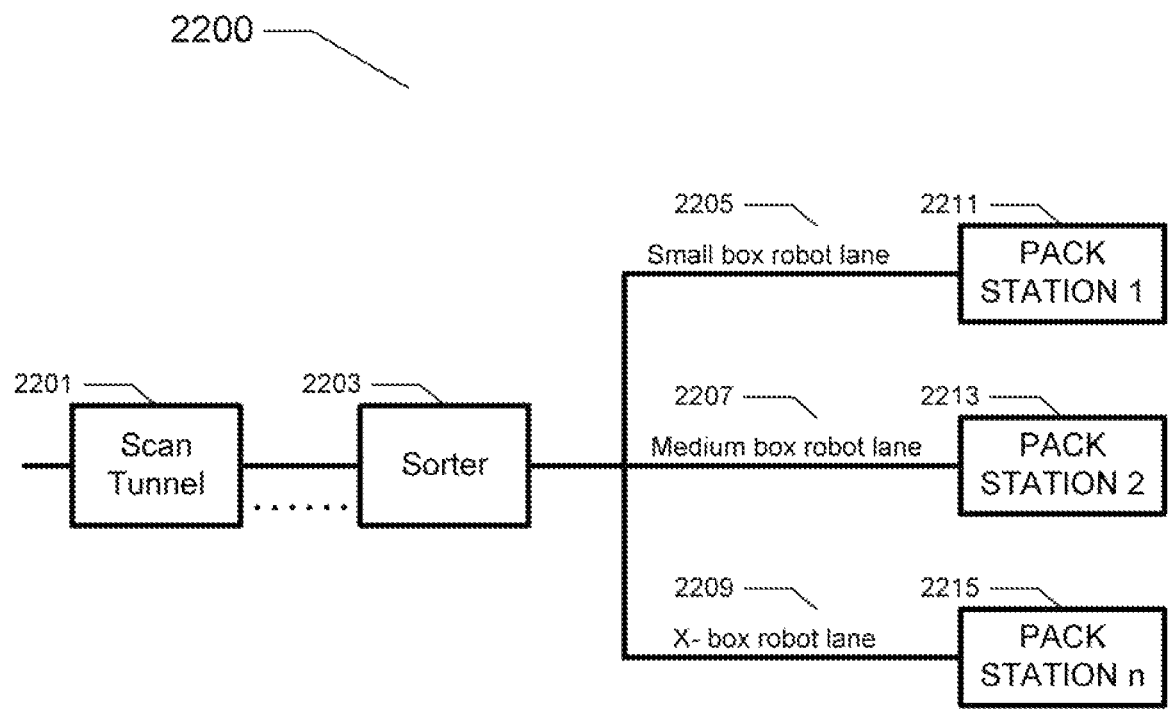
FIG. 22 is a mapping diagram depicting a multiple pack station system.

FIG. 22 is a mapping diagram depicting a multiple pack station system. In some embodiments of the present invention, multiple robotic pack stations may be employed to facilitate throughput as well as provide additional degrees of freedom related to packing of various size cartons and the like. A multiple pack station system, as described herein, represents further novelty related to the robotic pack station of the present invention, and is to be considered a further embodiment of the present invention. The mapping diagram in FIG. 22 represents a conveyor system with related components that assist in determining which robotic pack station to send a packing tote to. In FIG. 22, there are "n" robotic pack stations operating in parallel, each with a separate feed lane. Should a single robotic pack station be in operation, the scan tunnel may serve to scan the contents of a packing tote not for the purpose of selecting the appropriate robot lane and pack station, but to send commands to the box maker (box maker control) that signify the size or type of box or carton to use for that particular packing tote. Turning to FIG. 22, a scan tunnel 2201 can be seen with a conveyor (the connecting lines representing conveyor or conveyors) entering the scan tunnel 2201 and then leaving the scan tunnel 2201. The scan tunnel determines the contents of each packing tote and their attributes (size, weight, quantity, etc.) as it arrives at the scan tunnel. This allows the packing tote to be sent to the correct robotic pack station based on scanned parameters, or in some embodiments, to send control commands to a robotic pack station to configure the correct size carton for packing. The scan tunnel comprises at least one sensor or sensing system, and is not necessarily physically closed (although with some technologies such as machine vision a partially closed arrangement improves image quality and characteristics needed for deterministic actions. Alternative technologies to machine vision, including, but not limited to, force or weight sensors, ultrasonic sensors, laser or optical scanning devices, and the like, may also be employed. From the scan tunnel 2201, the packing tote enters a sorter 2203. The sorter 2203 receives messages from the scan tunnel 2201 regarding which robot lane to send the received packing tote to. This signal path is represented by the dotted line between the sorter 2203 and the scan tunnel 2201. The sorter 2203 comprises a switch or gate selector that diverts a received packing tote to the correct robot lane and subsequent robotic pack station based on attributes received from the scan tunnel 2201. Once the packing tote passes through the sorter, it is sent to the robot lane selected by the sorter. In FIG. 22, a small box robot lane 2205 can be seen which corresponds to pack station 1, a medium box robot lane 2207 can be seen that corresponds to pack station 2, and an "x-box" robot lane can be seen that corresponds to pack station n. The variables x and n indicate that this robot lane could be a multiplicity of lanes each with specific parameters (such as box size and the like).

Having described and illustrated the principles, components and methods of the present invention by reference to one or more preferred embodiments, it should be apparent that the preferred embodiment(s) described and envisioned herein may be modified in arrangement and detail without departing from the spirit and broad scope of the present invention, and that these modifications and variations are to be considered and construed as being included in the present application and invention described herein.

What is claimed is:

1. A robotic pack station comprising:
   a robotic arm;
   an end effector attached to the robotic arm;
   a work cell that houses and retains the robotic arm;
   a packing tote conveyer system that passes into the work cell and is configured to retain a packing tote;
   a pack platform connected with a take-away conveyor system for retaining boxes to be packed, and for moving boxes that have been packed by the robotic pack station;
   a machine vision system that captures images of items contained in the packing tote;
   a computer having a processor, memory, and access to computer readable media;
   a computer program stored on non-transitory computer readable media having a machine learning module;
   the machine learning module is adapted to receive the captured images of items contained in the packing tote and adapted to convert the captured images into parametric image files that are then converted into robotic arm control sequences;
   wherein the robotic arm is configured to move items contained in the packing tote into the boxes to be packed based on the robotic arm control sequences; and
   a bar code scanner aligned to read a bar code contained on the packing tote.

2. The robotic pack station of claim 1, further comprising a box forming unit.

3. The robotic pack station of claim 1, wherein the robotic arm control sequences include commands that control activation of the end effector based on parametric image files of an item to be picked up from the packing tote and moved to a box.

4. The robotic pack station of claim 1, wherein activation of the end effector comprises applying vacuum to at least one of a plurality of suction points.

5. The robotic pack station of claim 1, wherein at least one of the plurality of suction points is extendable.

6. The robotic pack station of claim 1, further comprising a database connected to the machine learning module.

7. The robotic pack station of claim 6, wherein the database stores past captured images, parametric image files and robotic arm control sequences.

8. The robotic pack station of claim 1, further comprising a network connection between the computer and a computer network for allowing remote access to the computer program.

9. A robotic pack station comprising:
   a robotic arm;
   an end effector attached to the robotic arm;
   a work cell that houses and retains the robotic arm;
   a packing tote conveyor system that passes into the work cell at a downward sloping angle and is configured to retain a packing tote;
   a pack platform located within the work cell and located above the packing tote conveyor system where the pack platform is configured to retain boxes to be packed;
   a take-away conveyor;
   a machine vision system that captures images of items contained in the packing tote;
   a computer having a processor, memory, and access to computer readable media;
   a computer program stored on non-transitory computer readable media having a machine learning module;
   the machine learning module is adapted to receive the captured images of items contained in the packing tote and adapted to convert the captured images into parametric image files that are then converted into robotic arm control sequences;
   wherein the robotic arm is configured to move items contained in the packing tote into the boxes to be packed based on the robotic arm control sequences; and
   a bar code scanner aligned to read a bar code contained on the packing tote.

10. The robotic pack station of claim 9, further comprising a box forming unit.

11. The robotic pack station of claim 9, wherein the robotic arm control sequences include commands that control activation of the end effector based on parametric image files of an item to be picked up from the packing tote and moved to a box.

12. The robotic pack station of claim 9, wherein activation of the end effector comprises applying vacuum to at least one of a plurality of suction points.

13. The robotic pack station of claim 9, wherein at least one of the plurality of suction points is extendable.

14. The robotic pack station of claim 9, further comprising a database connected to the machine learning module.

15. The robotic pack station of claim 14, wherein the database stores past captured images, parametric image files and robotic arm control sequences.

16. The robotic pack station of claim 9, further comprising a network connection between the computer and a computer network for allowing remote access to the computer program.

17. A method for robotically packing a carton, the method comprising the steps of:
   moving with a packing tote conveyor system a packing tote into a work cell at a downwardly sloping angle;
   resting the packing tote on the packing tote conveyor system at a downwardly sloping angle within the work cell;
   retrieving a carton with a robotic arm and end effector assembly;
   placing with the robotic arm and end effector assembly the retrieved carton on a pack platform above the rested packing tote;

identifying items in the rested packing tote with machine vision;

converting images of the identified items into parametric image files and then robotic arm control sequences;

moving, with the robotic a and end effector assembly, the identified items in the rested packing tote into the retrieved carton based on the robotic arm control sequences;

removing the emptied packing tote from the work cell by opening a gravity gate on the packing tote conveyor system; and removing the filled carton from the work cell by laterally pushing the filled carton with the robotic arm and end effector assembly from the pack platform onto a take-away conveyor.

18. The method for robotically packing a carton as recited in claim 17, further comprising the step of creating usage data comprising past item identification, parametric image files, and robotic arm control sequences.

19. The method for robotically packing a carton as recited in claim 18, further comprising the step of matching past image identification, parametric image files, and robotic arm control sequences with current image identification, parametric image files, and robotic arm control sequences.

20. The method for robotically packing a carton as recited in claim 17, further comprising the step of forming the carton.

* * * * *